US 6,793,178 B2

(12) United States Patent
Peterson

(10) Patent No.: US 6,793,178 B2
(45) Date of Patent: Sep. 21, 2004

(54) METHOD OF BOARDING PASSENGERS ON REGIONAL AIRCRAFT AND TRANSFERRING PASSENGERS BETWEEN A REGIONAL AIRCRAFT AND LARGER AIRCRAFT

(75) Inventor: Robert Peterson, Salt Lake City, UT (US)

(73) Assignee: Gatelink, LC, Salt Lake City, UT (US)

( * ) Notice: Subject to any disclaimer, the term of this patent is extended or adjusted under 35 U.S.C. 154(b) by 0 days.

(21) Appl. No.: 10/397,858

(22) Filed: Mar. 25, 2003

(65) Prior Publication Data

US 2004/0004158 A1 Jan. 8, 2004

Related U.S. Application Data

(63) Continuation-in-part of application No. 09/960,799, filed on Sep. 21, 2001, now Pat. No. 6,732,975, which is a continuation-in-part of application No. 09/575,222, filed on May 22, 2000, now Pat. No. 6,315,243.
(60) Provisional application No. 60/141,038, filed on Jun. 24, 1999.

(51) Int. Cl.[7] .................................................. B64F 1/32
(52) U.S. Cl. ............................ 244/114 R; 52/32; 52/33
(58) Field of Search .......................... 244/114 R; 52/32, 52/33

(56) References Cited

U.S. PATENT DOCUMENTS

| | | | | | |
|---|---|---|---|---|---|
| 1,894,528 | A | * | 1/1933 | Zimmerman | 52/67 |
| 2,470,696 | A | * | 5/1949 | Gonzalez et al. | 198/367 |
| 3,571,990 | A | * | 3/1971 | Rossman | 52/30 |
| 4,218,034 | A | * | 8/1980 | Magill | 244/114 R |
| 6,279,855 | B1 | * | 8/2001 | Domer | 244/114 R |

* cited by examiner

Primary Examiner—J. Woodrow Eldred
(74) Attorney, Agent, or Firm—Steven L. Nichols; Rader, Fishman & Grauer PLLC

(57) ABSTRACT

A regional aircraft boarding pier can be provided at an airport concourse in place of one or two conventional large aircraft boarding bridges. The regional aircraft boarding pier includes a primary passenger bridge between the airport concourse and a hub. A number of secondary passenger bridges extend from the hub to individual regional aircraft. In this way, an equivalent number of passenger seats can be serviced as between large and regional aircraft, and large and regional aircraft can be docked at a common airport terminal. Consequently, passengers can more efficiently and conveniently transfer between connecting flights that are on both large and regional aircraft. The hub of the boarding pier can take a number of configurations to optimally use the space available. The hub can also support large aircraft boarding bridges as well as the secondary passenger bridges docked to smaller, regional aircraft.

20 Claims, 25 Drawing Sheets

METHOD OF BOARDING PASSENGERS ON REGIONAL AIRCRAFT AND TRANSFERRING PASSENGERS BETWEEN A REGIONAL AIRCRAFT AND LARGER AIRCRAFT

RELATED APPLICATIONS

This is a Continuation-In-Part of U.S. patent application Ser. No. 09/960,799, filed Sep. 21, 2001, now U.S. Pat. No. 6,732,975 which is a Continuation-In-Part of Ser. No. 09/575,222 filed May 22, 2000 now U.S. Pat. No. 6,315,243, which is a utility application filing based upon U.S. Provisional Application Ser. No. 60/141,038 filed Jun. 24, 1999.

TECHNICAL FIELD

An embodiment of the present invention relates to the field of airline travel. More particularly, an embodiment of the present invention relates to the field of aircraft boarding piers, specifically to aircraft boarding piers servicing smaller, regional aircraft. An embodiment of the present invention provides among other things the integration of a regional aircraft boarding pier in an airport concourse with existing bridges for larger jet passenger aircraft.

TECHNICAL BACKGROUND

Air travel has becoming increasing popular over the past decade and has evolved to handle an ever growing passenger volume. An important aspect of this evolution is the structure of flight routes through a "hub" airport. Today, hub routing has become an essential part of the efficient operation of an airline.

This trend has been aided by the advent of regional aircraft. As used herein, the term "regional aircraft" refers to jet or propeller aircraft that are smaller than typical large commercial airline passenger jets and are used to service regional, as opposed to national, passenger routes. Regional aircraft will typically be identified as having about 110 seats or less. Aircraft with substantially more than 110 seats and which are used to travel traditional airline routes between major airports are considered "large aircraft" or "large jets" herein. The advent of regional aircraft has created a new market for air travel in which air passengers can span relatively large distances quickly on a regional aircraft at the end or beginning of a trip while using a larger jet to cover the bulk of the trip mileage.

Manufacturers of regional aircraft, particularly craft with 50 or fewer seats, include Brazilian aircraft maker Embraer SA, Canada's Bombardier and Fairchild Aerospace of the United States. The popularity of regional aircraft produced by these manufacturers has exceeded expectations. For example, Bombardier forecast initial sales of 400 aircraft when it launched its regional jet model in the early 1990s. Bombardier instead received orders and options for 1,066 of its CRJ-200 50-seater and larger CRJ-700 derivative. Similarly, Embraer booked dozens more orders than expected for its ERJ-135 and ERJ-145 aircraft at a recent Paris air show.

Capitalizing on this strong commercial interest, Bombardier has launched the CRJ-700, a 70-seat aircraft, and plans an even larger BRJ-X model with 90 or 110 seats. Fairchild has recently launched the 70-seat 728JET and also offers a longer version with around 100 seats. Embraer has also booked orders for its new ERJ-170 and ERJ-190, with about 70 and 100 seats, respectively.

One problem with regional aircraft travel is that the regional aircraft terminal is often located at a site remote from the main terminal. Consequently, a passenger on a regional aircraft, whether transferring to or from a large aircraft, needs to traverse the length of the airport and/or travel between terminals to make the transfer. As air travel becomes increasingly popular and important to the economy, the frequent regional aircraft passenger represents an increasing share of the air travel market. Consequently, a significant problem is presented by the remote location of the regional aircraft terminal, which prevents quick and seamless plane transfers for the regional aircraft passenger. Additionally, the remote location of the regional aircraft terminal also affects airline scheduling for large aircraft because passengers must be allowed time to traverse the often large distances between a regional aircraft boarding gate and the boarding gate for the large aircraft.

Another problem with regional aircraft travel is that the passenger is frequently required to walk outside on the tarmac and climb stairs to board the regional aircraft. If the weather is inclement, boarding and deplaning from a regional aircraft is made more difficult than boarding and deplaning from large aircraft entirely within the closed and conditioned space of conventional airports, which have been developed, for large aircraft.

Where a passenger is unable to walk, boarding a regional aircraft from the tarmac in a wheelchair can present additional problems. In the past, these problems have been addressed by building some kind of wheelchair lift. However, such boarding is often time consuming and can be a source of embarrassment or self-consciousness for the wheelchair passenger. The combination of a wheelchair lift and inclement weather may make the prospect of regional aircraft travel even less acceptable for disabled passengers.

Consequently, there is a need in the art to make regional aircraft travel more convenient and efficient. Specifically, as regional aircraft become more prevalent, a need exists to integrate terminals and boarding gates for the regional aircraft with terminals and boarding gates for large aircraft in a manner that overcomes at least some of the problems of the prior art.

SUMMARY OF SELECTED EMBODIMENTS

One embodiment encompasses a method of integrating boarding facilities for a number of regional aircraft and large jets in a single airport concourse. The method includes, providing an airport concourse with a number of conventional large jet passenger bridges that are connected to the concourse. The large jet passenger bridges have a traditional elevation above the tarmac that is continuously adjustable to match the sill height of a variety of large jets. Under one embodiment, this method further includes constructing at least one regional aircraft boarding pier connected to the same concourse. The regional aircraft boarding pier is structured as set forth above.

This method of integrating boarding facilities for regional aircraft and large jets in a single airport concourse may be used with a variety of airport concourse configurations. For example, the common concourse supporting both large and regional aircraft boarding facilities may be an elongated structure attached to a network of additional concourses. Alternatively, the common concourse may be, or be part of, a midfield terminal. Such a midfield terminal may be elongated or circular.

One embodiment encompasses the method of retrofitting an existing airport concourse with at least one regional aircraft boarding pier as described above. One embodiment includes replacing two adjacent large jet passenger bridges with a regional aircraft boarding pier that has the same structure as set forth above.

One embodiment encompasses a method of transferring air passengers between at least one regional aircraft and a large jet or another regional aircraft. The method allows for air passengers to transfer between a regional aircraft and a large jet or between two regional aircraft without climbing stairs to the aircraft from the tarmac and without walking out of the enclosed controlled atmosphere of the airport. The method includes providing an airport concourse and docking at least one large jet to a large jet passenger bridge that is connected to the concourse. The method continues by docking at least one regional aircraft to a regional aircraft boarding pier that is connected to the same concourse. The regional aircraft boarding pier has the inventive structure as set forth above.

A passenger then transfers either between the large jet and the regional aircraft, or between the regional aircraft and another regional aircraft. Consequently, the passenger can switch aircraft, including a switch between a large jet and a regional aircraft, without leaving the concourse. This prevents the passenger from experiencing either inclement weather or having to use a wheelchair lift to reach the airplane. This also prevents the passenger from having to traverse a great distance between connecting flights as both large and regional aircraft can be docked at the common concourse.

Another embodiment relates to a passenger with a single-use of one of the regional aircraft boarding pier embodiments, without a transfer to/from another regional passenger aircraft, or to/from a large jet. Another embodiment relates to a passenger with a double-use of one of the regional aircraft boarding pier embodiments, without a transfer to/from another regional passenger aircraft, or to/from a large jet. In the double-use embodiment, the passenger boards by use of a regional aircraft boarding pier embodiment, and likewise deplanes by use of a regional aircraft boarding pier embodiment.

One embodiment also encompasses a system of docking regional aircraft. The system of docking regional aircraft includes at least one regional aircraft boarding pier that has at hub, a number of regional aircraft passenger bridges connected to and radiating from the hub, and a number of regional aircraft respectively docked at the regional aircraft passenger bridges. This system of docking regional aircraft may further include a concourse passenger bridge connecting the pier hub to an airport concourse.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION

Using the drawings, selected embodiments will now be explained. In this explanation, as above, a "large aircraft" is an aircraft with substantially more than about 110 passenger seats. Large aircraft can be either jet or propeller driven. Non-limiting examples of large aircraft include the DC-9 or Boeing 717 at the smaller end of the scale, up to the Boeing 747 or larger or a Boeing 767 at the larger end of the scale. A "regional aircraft" is an aircraft with a passenger capacity from about 6 to about 110 passengers. Non-limiting examples of regional aircraft include aircraft made by LM Bombardier, Embraer, Fairchild Aerospace, Gulf Stream, Cessna, Learjet, and others.

In one embodiment, many of the problems of the prior art can be overcome with a regional aircraft boarding pier, described in detail below, which is integrated into a common concourse with boarding facilities for large aircraft. As used herein, a "concourse" is a single structure or wing of an airport with sequentially numbered boarding gates for passenger aircraft. The term airport "terminal" is synonymous with concourse or denotes a group of interconnected concourses. Hereinafter, "terminal" and "concourse" will be referred to as "terminal" unless otherwise defined.

Figure 1:
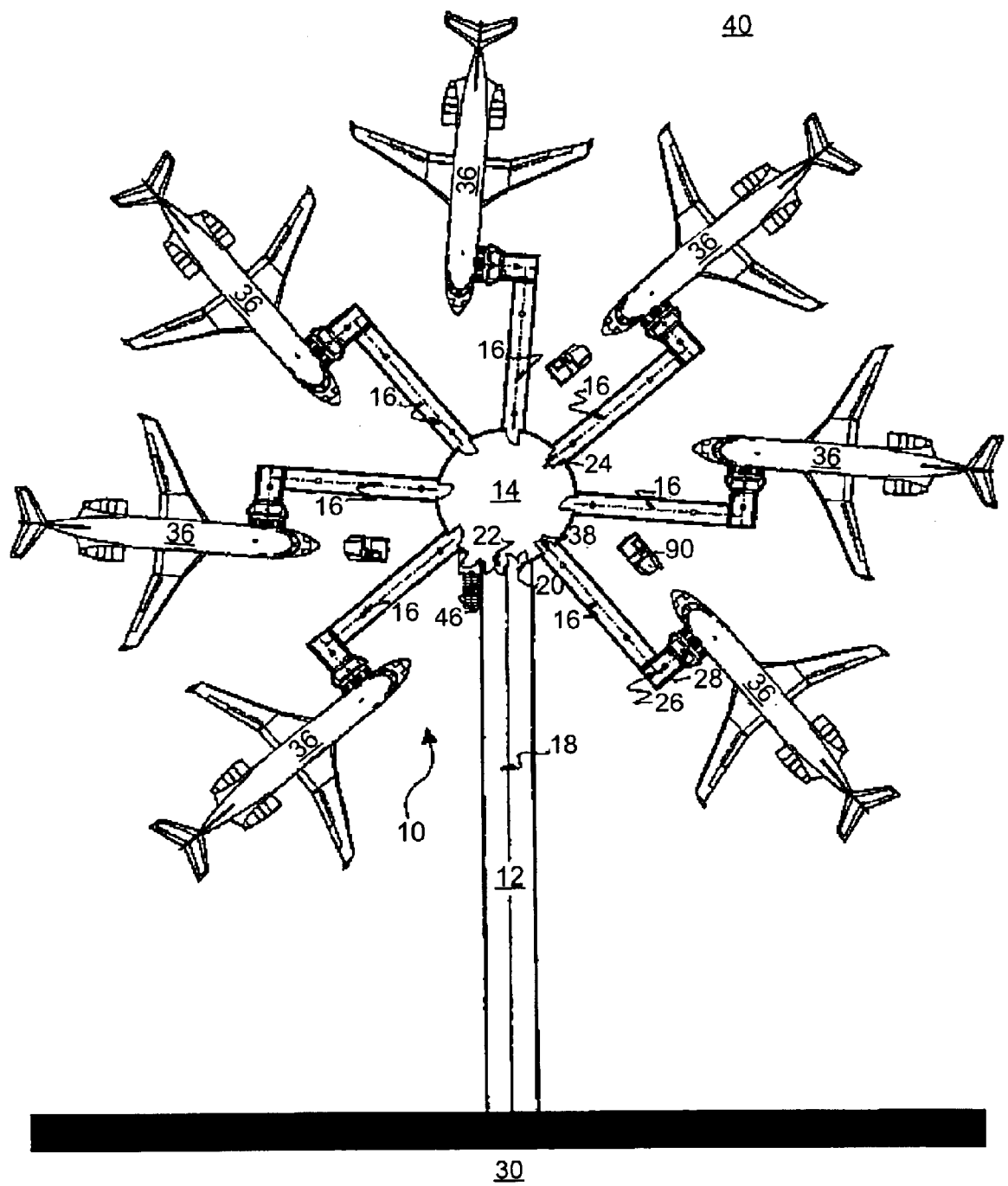
FIG. 1 is plan view of the regional aircraft boarding pier according to an embodiment of the present invention with a plurality of regional aircraft docked thereto.

FIG. 1 is plan view of a regional aircraft boarding pier according to an embodiment. As shown in FIG. 1, the regional aircraft boarding pier 10 includes a primary regional aircraft passenger bridge 12. The primary regional aircraft passenger bridge 12 has an appropriate length and width to allow passengers to move between the airport terminal or concourse 30 and the docked aircraft. In one embodiment, divider rail 18 is placed within the primary regional aircraft passenger bridge 12 to allow for simultaneous passenger boarding and deplaning without interference between the two groups of passengers.

In one embodiment, hub 14 is connected to the primary regional aircraft passenger bridge 12. In one embodiment, a number of secondary regional aircraft passenger bridges 16 are connected to and radiate outward from the pier hub 14. In one embodiment, each secondary regional aircraft passenger bridge 16 has an appropriate length and width to allow passengers to move through the bridge 16 to and from a regional aircraft 36. In one embodiment, the length and width of the secondary bridges 16 is smaller than those dimensions of the primary passenger bridge 12.

In one embodiment, at least one of the secondary regional aircraft passenger bridges 16 docks with a regional aircraft 36, thereby connecting the aircraft 36 to the hub 14, primary bridge 12 and, ultimately, the airport concourse or terminal 30. In one embodiment, the docking portion 26 of each secondary bridge 16 includes a flexible accordion connector 28 to provide a weather-tight fit against the side of the aircraft 36. In one embodiment, an emergency exit stairway 46 is connected to hub 14 to allow for immediate egress to the tarmac in the event of an emergency.

In order to accommodate differently sized regional aircraft, one embodiment allows the ends 26 of the secondary bridges 16 that dock with the regional aircraft 36 to be adjusted up and down in elevation relative to the tarmac 40. Therefore, the regional aircraft boarding pier 10 is a fixed, elevating structure. Consequently, no tarmac drive is used to dock the aircraft. Alternatively, a tarmac or apron drive may be used with a regional aircraft boarding pier 10 according to an embodiment.

Because the opposite ends 22 of the secondary bridges 16 are pivotally attached to the hub 14, adjusting the elevation of the docking end 26 of the bridges 16 alters the slope or pitch of the bridge. In one embodiment, the bridge 16 is maintained with a pitch in the range from level to having a one foot of rise or fall for every 12 feet of run. In one embodiment, the pitch is kept at one foot of rise or fall, or less, for every 20 feet of run. As necessary according to an embodiment, the secondary bridges 16 are pitched outside the range under the principles of the disclosed embodiments. Where the pitch range is exceeded, hand railings can be installed within each such bridge 16.

In one embodiment, each secondary regional aircraft passenger bridge 16 has a length from about 20 feet to about 80 feet. In one embodiment, the length at least one of the bridges 16 is about 40 feet. In one embodiment, the, width of at least one of the secondary regional aircraft passenger bridges 16 is in the range from about four feet to about ten feet. In one embodiment, the width of at least one of the bridges 16 is about six feet.

In one embodiment, the length of the primary regional aircraft passenger bridge 12 is in the range from about 60 feet to about 300 feet. In one embodiment, the length is about 180 feet. Other length embodiments can be achieved depending upon the specific size and configuration of the particular regional aircraft being docked, perhaps as compared with other regional aircraft also being docked.

In one embodiment, the pitch for the primary regional aircraft passenger bridge 12 is in the range from level to about one foot of rise or fall for every 12 feet of run. In one embodiment, the pitch of the primary bridge 12 is about one foot of rise or fall for every 20 feet of run. In one embodiment, width for the primary regional aircraft passenger bridge 12 is about 12 to about 20 feet. In one embodiment, the width of the primary bridge 12 is about 16 feet.

In one embodiment, the hub 14 has an elevation above the tarmac 40 in the range from about two feet to about eight feet. In one embodiment, to accommodate wheeled access from ground level, the hub 14 has an elevation from zero to two feet above the tarmac 4. However, if the hub 14 is situated at ground level, the general length of the secondary bridges 16 will most likely have to be increased to accommodate the rise to the sill height or entry level of a regional aircraft. In one embodiment, the hub 14 has an elevation of about six feet above the tarmac 40.

Figure 2:
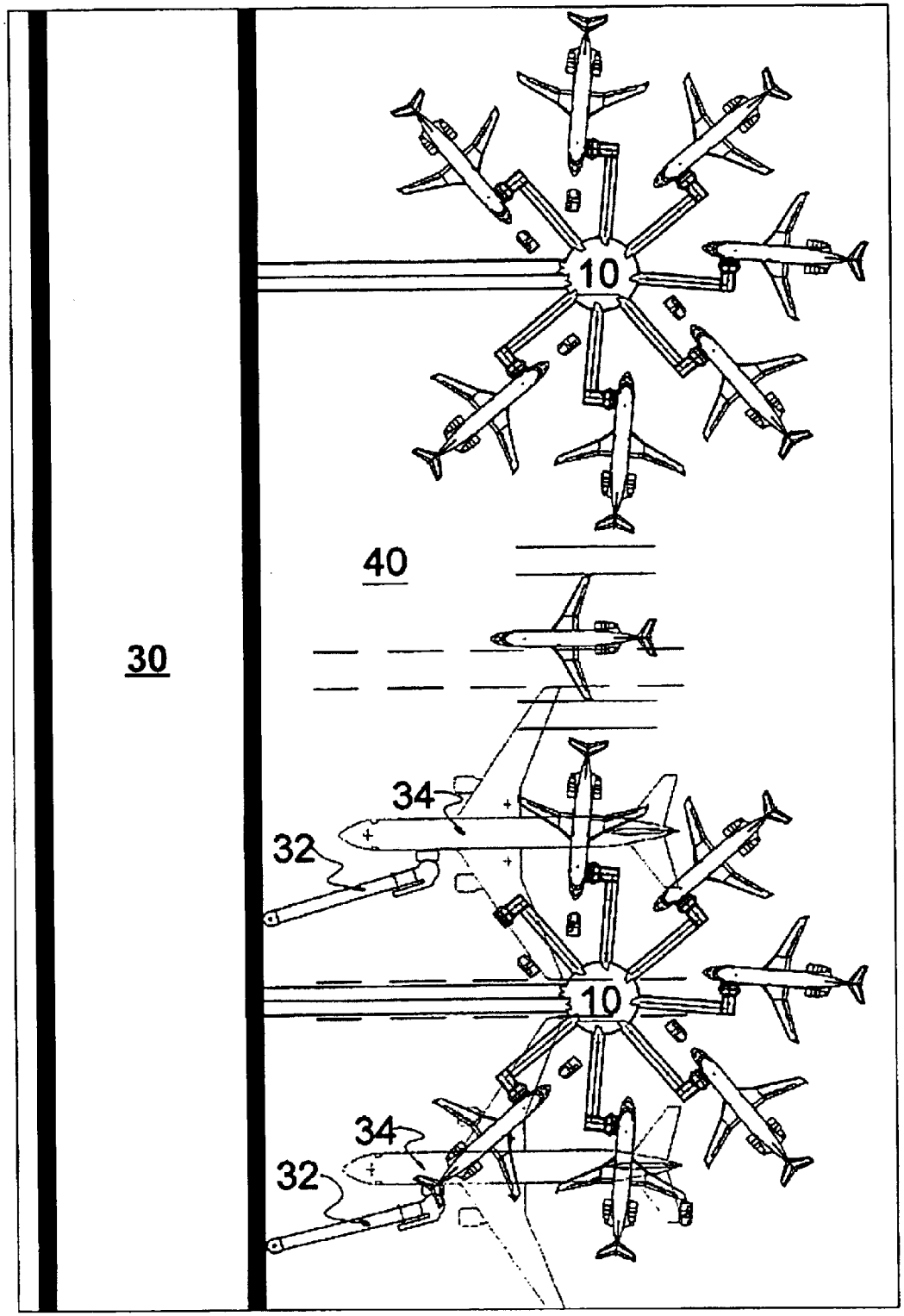
FIG. 2 is plan view of the integration of a regional aircraft boarding pier with a concourse that services large aircraft according to an embodiment of the present invention.

FIG. 2 is plan view illustration of the integration of a regional aircraft boarding pier 10 with a concourse 30 that also services, or previously serviced, large aircraft 34 according to an embodiment. As shown in ghost in FIG. 2, a number of large aircraft passenger bridges 32 are provided from the airport concourse 30. As shown in FIG. 2, each large aircraft passenger bridge 32 services a single large aircraft 34.

In one embodiment, a retrofit of the existing concourse 30, is carried out that replaces two of the large aircraft passenger bridges 32 for large aircraft 34 with a regional aircraft boarding pier 10 for a number of regional aircraft 36. The large passenger bridges 32 and large aircraft 34 which have been replaced are illustrated in ghost in FIG. 2. As will be appreciated by those skilled in the art, the concourse 30 continues to have a number of large aircraft passenger bridges 32 even after the retrofit installs a regional aircraft boarding pier 10 according to an embodiment, (See FIG. 3).

Under this retrofitting method embodiment, it is also possible to remove only a single large aircraft bridge 32 and replace that bridge 32 with a single regional aircraft boarding pier 10 embodiment. However, this will likely require greater length in the, primary bridge 12 of the regional aircraft boarding pier 10 in order to avoid interference with adjacent boarding facilities. Consequently, removing at least two adjacent large jet passenger bridges 32 is an embodiment that makes room for a single regional aircraft boarding pier 10. FIG. 2 shows the superimposition of the regional aircraft boarding pier 10 over the same real estate on the tarmac 40 as previously occupied by two large jet service areas.

Under the principles of embodiments disclosed herein, the hub 14 of the regional aircraft boarding pier 10 has a variety of different configurations. In one embodiment, the hub 14 is a circular structure with a minimum width in the range from about ten to about 40 feet. In one embodiment, the hub 14 has a minimum width of about 20 feet, although it need not be circular.

Figure 3:
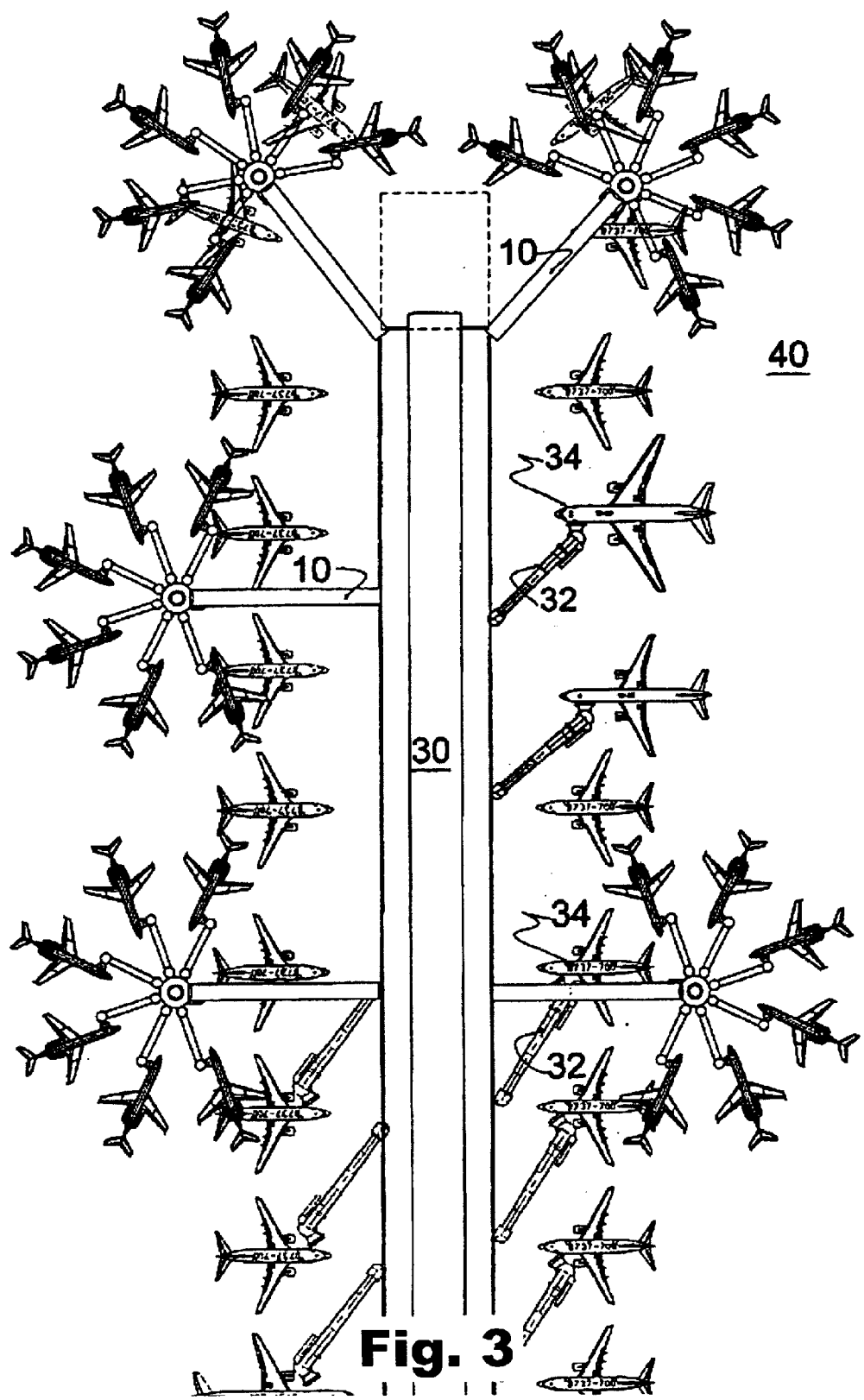
FIG. 3 is a plan view of a concourse according to an embodiment of the present invention in which a number of regional aircraft boarding piers have replaced passenger bridges for larger aircraft, with some passenger bridges for larger aircraft remaining such that both large aircraft and regional aircraft can be docked and loaded at the same concourse.

FIG. 3 further illustrates the concourse 30 where some of the large aircraft passenger bridges 32 that service large aircraft 34 have been replaced by regional aircraft boarding piers 10 according to an embodiment. FIG. 3 shows the regional aircraft boarding piers 10 superimposed over the real estate previous occupied by large aircraft service areas. As shown in FIG. 3, equivalent building frontage is occupied by the regional aircraft boarding layout as compared to a comparable large jet parking layout.

Significantly, FIG. 3 also shows large aircraft passenger bridges 32 servicing large aircraft 34 from the same concourse 30 as that to which the regional aircraft boarding piers 10 are connected. Consequently, as noted above, under the principles of an embodiment, a single concourse 30 is made to service both large and regional aircraft by integrating both a large aircraft passenger bridge 32 with a regional aircraft boarding pier 10.

Referring again to FIG. 1, various densities of secondary passenger bridges 16 will now be discussed. As shown in FIG. 1, an embodiment provides, for example, seven secondary regional aircraft passenger bridges 16 from a circular hub 14. In one embodiment, a regional aircraft pier with six or seven secondary bridges 16 is a given configuration so as to maximize the number of regional aircraft 36 that can be docked through the hub 14.

In one embodiment where the operational area for constructing the regional aircraft boarding pier 10 and servicing regional aircraft 36 is restricted to closer to the concourse 30 and the number of secondary regional aircraft passenger bridges 16 is reduced so that the primary bridge 12 can be shortened. In FIG. 1, the reduction in the number of secondary bridges 16 is accomplished by removing the two bridges 16' closest to the concourse 30 and the aircraft 36' docked thereto. With only five remaining secondary bridges 16 connected to the hub 14, the primary regional aircraft passenger bridge 12 can be substantially shortened to accommodate available space.

In one embodiment, the regional aircraft boarding pier 10 illustrated in FIG. 1 has an operational footprint that occupies an area of about 360 feet by about 360 feet. The operational footprint refers to the space around the regional aircraft boarding pier 10 within which regional aircraft may move. Typically, the allowable size of the operational footprint around the regional aircraft boarding pier 10 is determined by the regulations of the Federal Aviation Administration (FAA) or its counterpart agencies in countries other than the United States. In some embodiments, the footprint of the regional aircraft boarding pier 10 occupies a smaller area, for example, 150 ft by about 300 ft.

The building frontage required by the regional aircraft boarding pier 10 is also reduced per passenger seat by the embodiment set forth in this disclosure. In one embodiment, the regional aircraft boarding pier 10 occupies an operational building frontage of about 360 feet.

Returning to FIG. 2, where a regional aircraft boarding pier 10 according to one embodiment, is substituted for two existing large aircraft bridges 32, it can be achieved to avoid any decrease is passenger capacity. In other words, the number of seats on the regional aircraft 36 docked at the regional aircraft boarding pier 10 should be roughly equal to the number of seats on two large aircraft so that the regional aircraft boarding pier 10 services an equivalent number of regional aircraft passenger seats in about the same tarmac area and building frontage occupied as would have been serviced by two large aircraft passenger bridges 32 connecting to two wide-body large aircraft. Consequently in one embodiment, the regional aircraft boarding pier 10 services about 400 to 500 regional aircraft passenger seats distributed among approximately six or seven regional aircraft.

Figure 4:
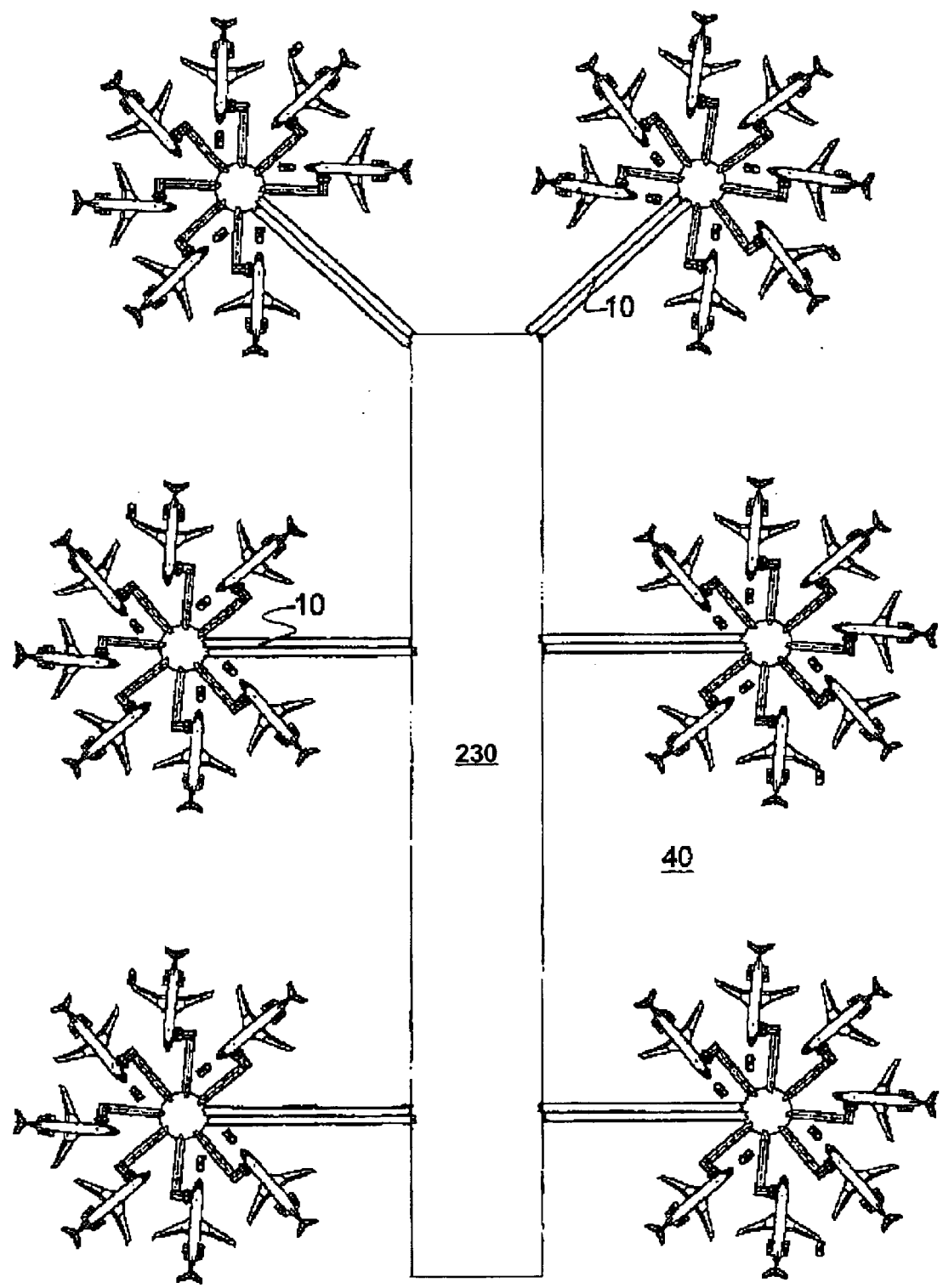
FIG. 4 is a plan view of an embodiment of the present invention in which a number of regional aircraft boarding piers are attached to a rectangular concourse.
Figure 5:
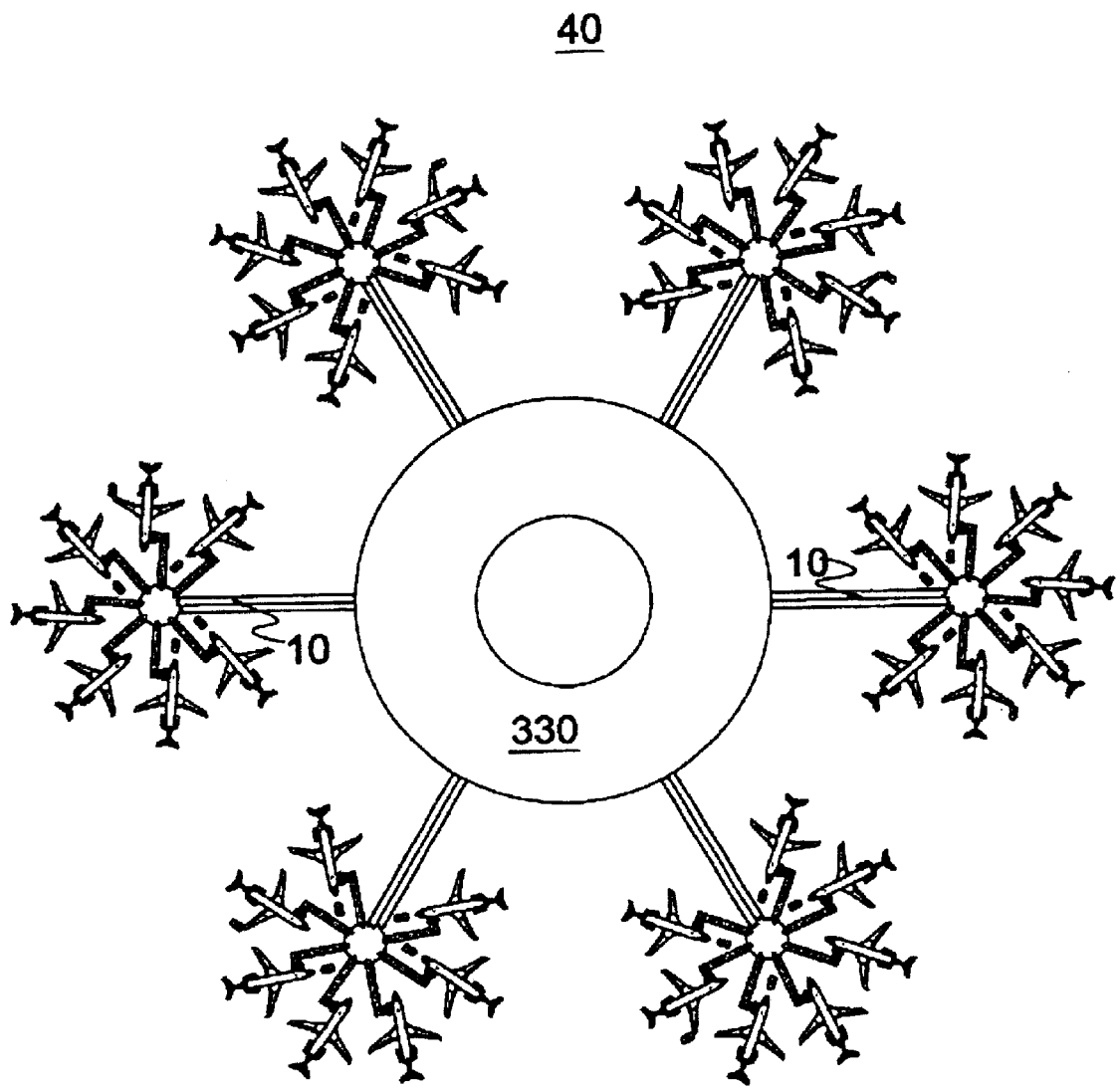
FIG. 5 is a plan view of an embodiment of the present invention in which a number of regional aircraft boarding piers are attached to a circular concourse.

FIG. 4 illustrates a number of regional aircraft boarding piers 10 according to an embodiment, which are connected to an elongated airport concourse 230. FIG. 5 illustrates a number of the regional aircraft boarding piers 10 according to an embodiment which are connected to a circular airport concourse 330. In one embodiment, the regional aircraft boarding piers 10 are used with any concourse or terminal configuration. In one embodiment, either concourse, the rectangular 230 or circular 330, is a midfield concourse or is structurally connected to a larger concourse network. According to an alternative embodiment, the concourse, either midfield or networked, is a curved structure.

Figure 6:
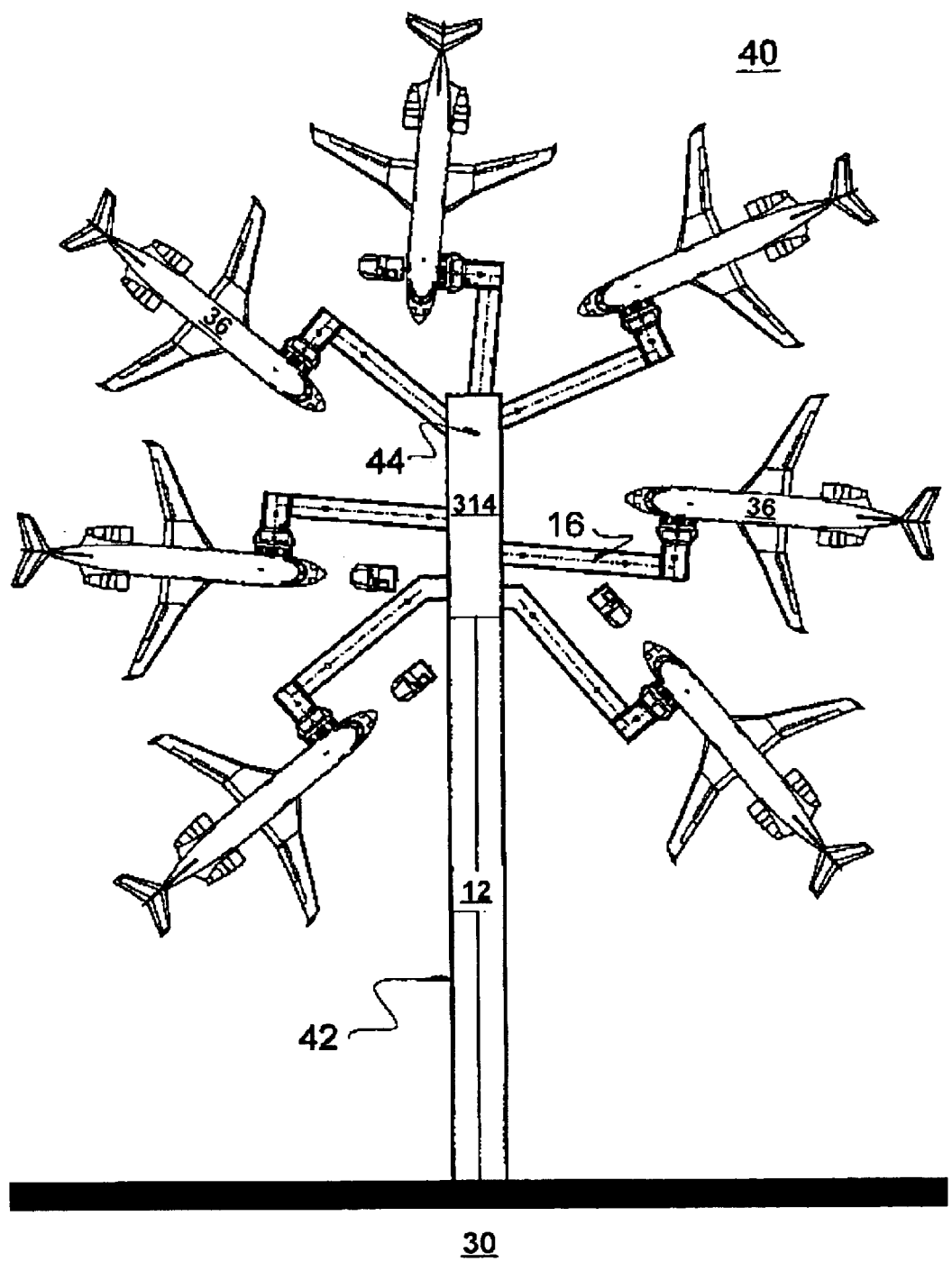
FIG. 6 is plan view of an embodiment of the present invention in which a hub supporting a number of regional aircraft boarding bridges has an elongated configuration.

Alternative hub configuration embodiments for the regional aircraft pier will now be discussed. FIG. 6 is plan view of another embodiment in which the hub 314 between the primary bridge 12 and the secondary bridges 16 has an elongated configuration. As shown in FIG. 6 according to an embodiment, the primary regional aircraft passenger bridge 12 and the hub 314 have parallel elongated walls 42 and 44, respectively. According to an embodiment, the width of the hub 314 is the same as the primary bridge 12 or is wider to better accommodate passenger movement between secondary bridges 16.

Figure 7:
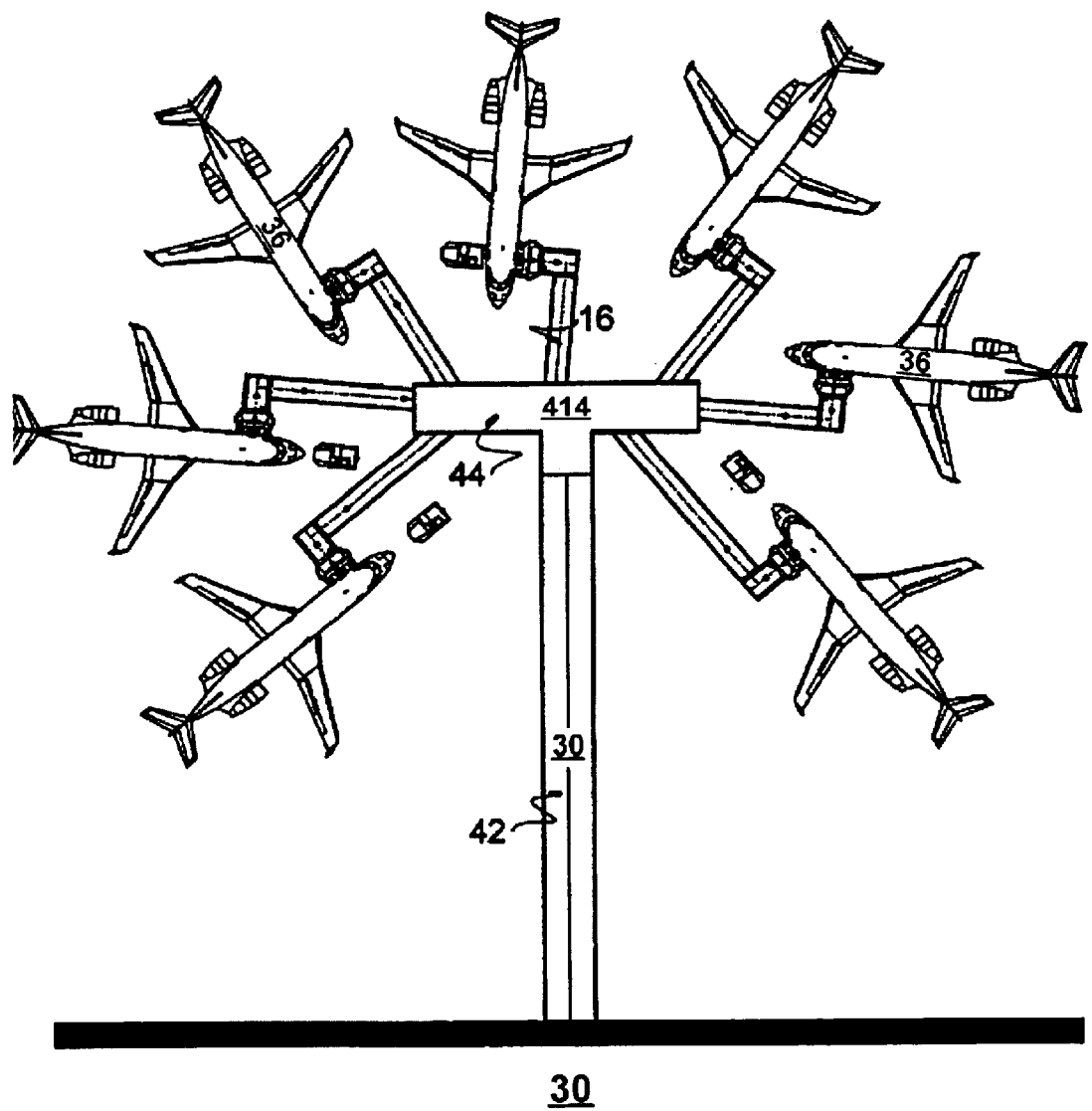
FIG. 7 is a plan view of an embodiment of the present invention in which a hub supporting a number of regional aircraft boarding bridges has an elongated configuration that is situated orthogonal to a principal passenger bridge.

FIG. 7 is a plan view of still another embodiment in which the hub 414 has an elongated configuration that is arranged orthogonally to the primary regional aircraft passenger bridge 12. The primary regional aircraft passenger bridge 12 and hub 414 have orthogonal elongated walls 42 and 44, respectively. While in one embodiment of FIG. 7, the elongated hub 414 is orthogonal to the primary passenger bridge 12, the elongated hub 414 could be disposed at any non-zero angle with respect to the primary passenger bridge 12 to accommodate existing structures and obstacles according to another embodiment.

Figure 8:
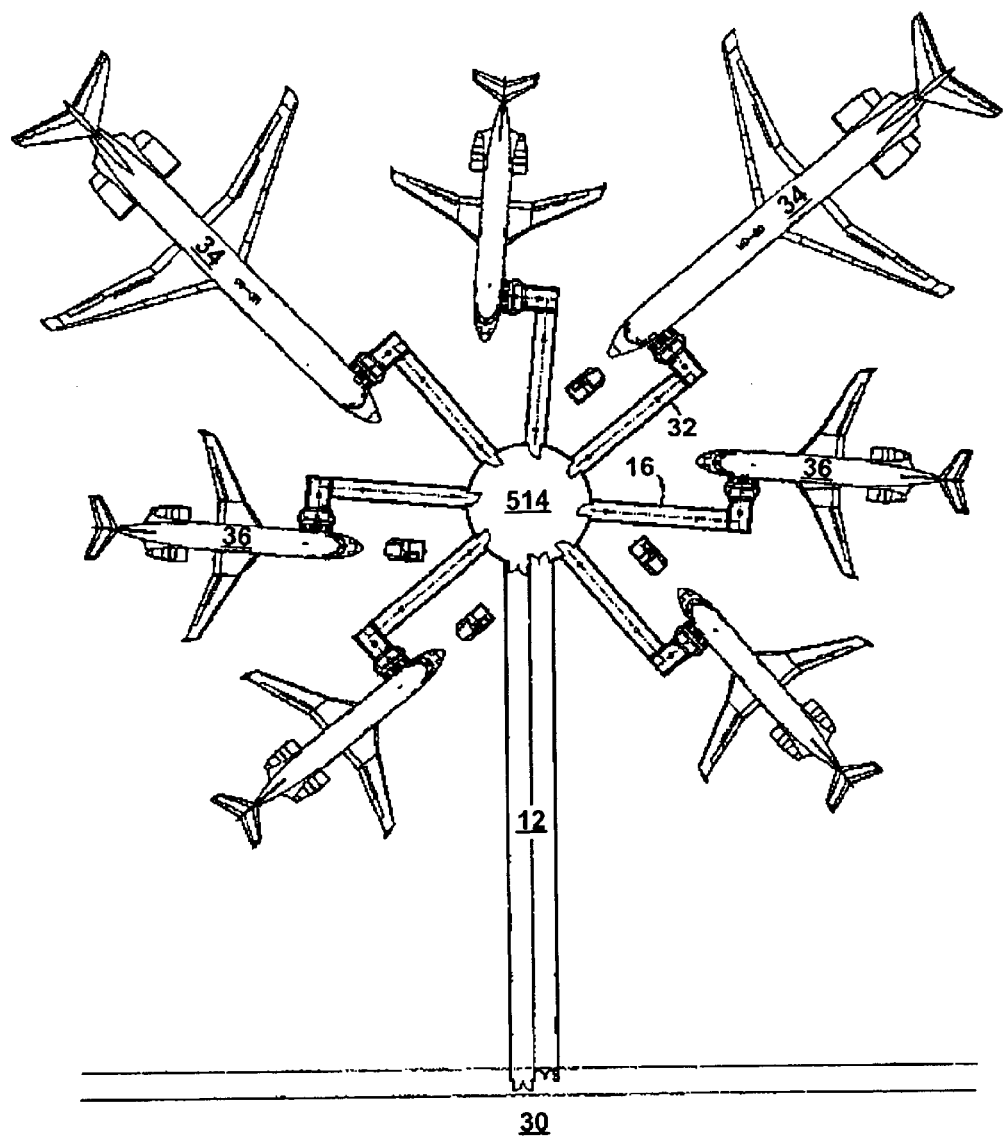
FIG. 8 is a plan view of an embodiment of the present invention in which the boarding, pier includes accommodation for large aircraft or larger regional aircraft.

FIG. 8 illustrates a method embodiment in which large and regional aircraft are serviced at the same concourse. As shown in FIG. 3, both regional aircraft piers 10 and large aircraft bridges 32 are provided from a common concourse 30 to support, respectively, regional and large aircraft. Additionally, as shown in FIG. 8, the regional aircraft boarding pier 10 according to a second embodiment, includes a hub 514 from which extend both secondary bridges 16 for docking regional aircraft 36 and large aircraft bridges 32 for docking large aircraft 34. In order to accommodate large aircraft bridges 32, the number of secondary bridges 16 on the hub 514 is reduced or the length of the large aircraft bridges 32 is extended to allow the interspersing of large and regional aircraft as shown, for example, in FIG. 8.

Figure 9:
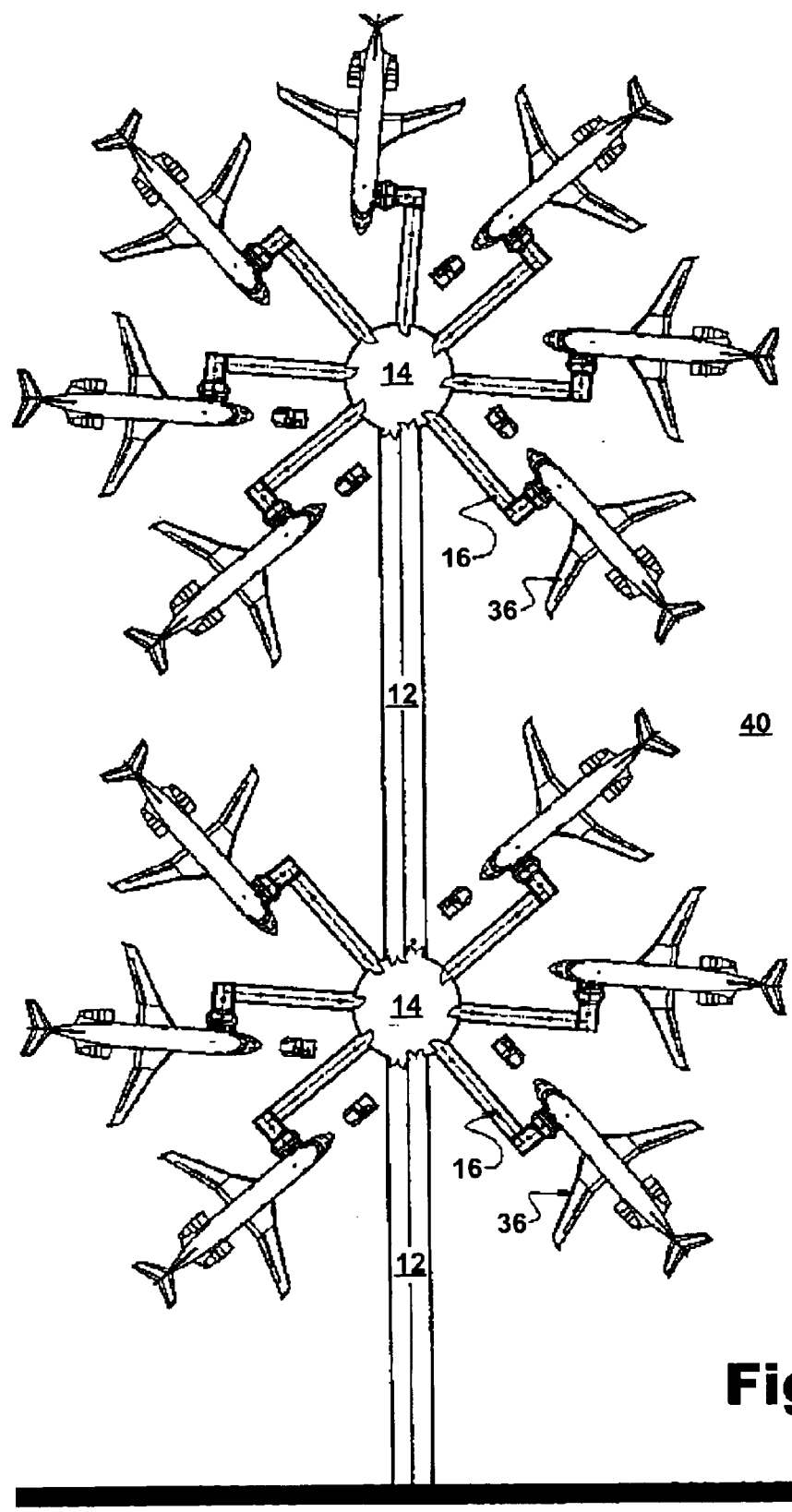
FIG. 9 is a plan view of an embodiment of the present invention in which a second regional aircraft boarding pier is supported by the hub of a first regional aircraft passenger bridge.

FIG. 9. Illustrates another embodiment in which multiple hubs 14 are provided as part of a single regional aircraft pier 110. As shown in FIG. 9, a first hub 14A is connected to an airport concourse 30 by a first primary passenger bridge 12A. A number of secondary passenger bridges 16 extend from the first hub 14A to dock with regional aircraft 36. A second primary passenger bridge 12B also extends between the first hub 14A and a second hub 14B. A second group of secondary passenger bridges 16 extend from the second hub 14B. In this way, a larger number of secondary bridges 16 and docking slips for regional aircraft 36 are provided. Given the space limitations of the particular site in question, any number of additional hubs could be connected by primary passenger bridges 12 according to the principles illustrated in FIG. 9.

Figure 10:
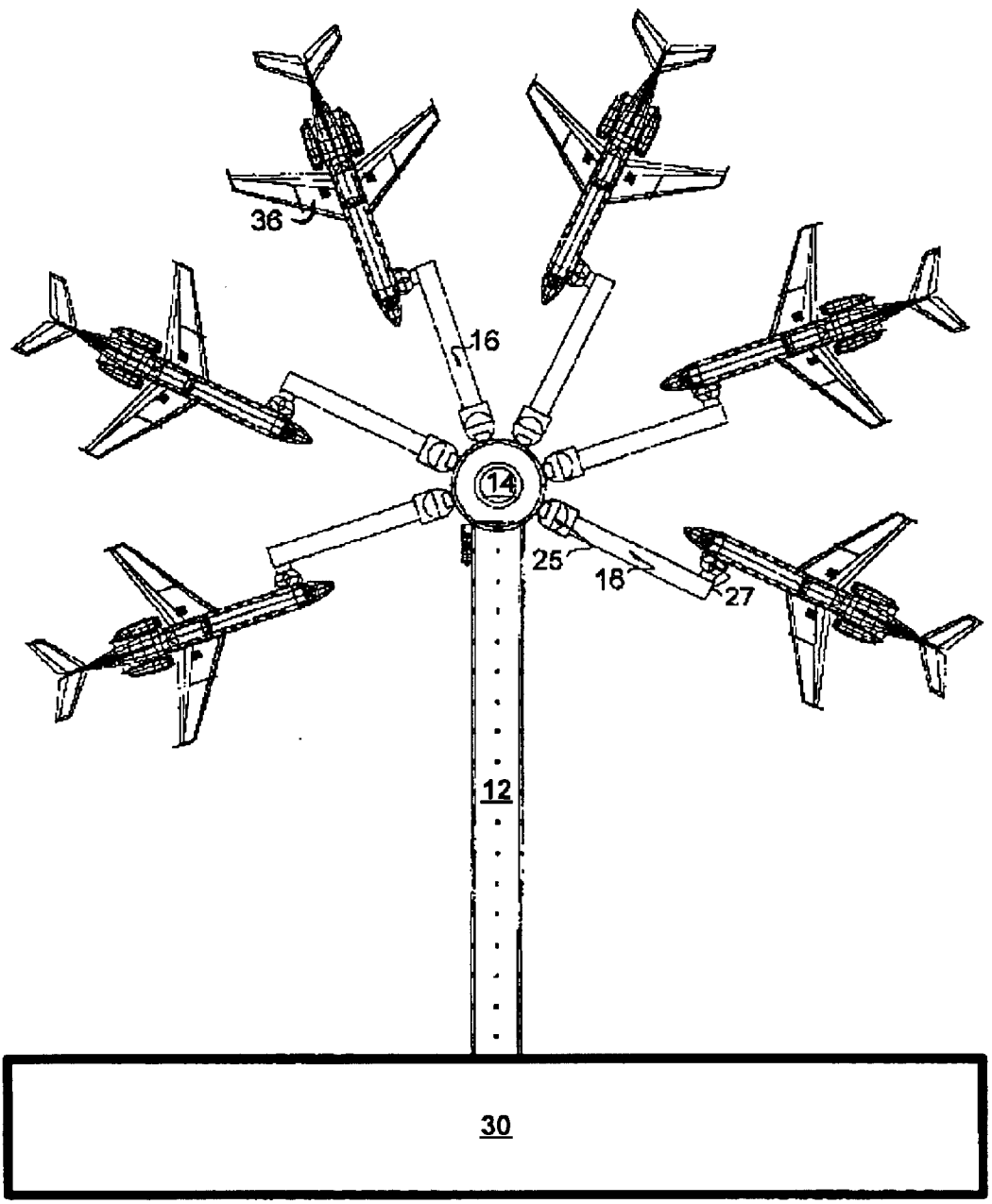
FIG. 10 is a plan view of an embodiment of the present invention in which each secondary passenger bridge pivots with respect to the hub to accommodate a docked aircraft.

FIG. 10 illustrates another embodiment of the present invention in which the secondary passenger bridges 16 extending from the hub 14 are pivotally connected to the hub 14 through a primary hinge point 25. The hinge point 25 pivotally connects the secondary passenger bridge 16 to the hub 14 so that the secondary passenger bridge 16 can pivot around the primary hinge point 25. In this way, the secondary passenger bridge 16 can be driven so that the docking end 27 of the secondary passenger bridge 16 can be swung toward or away from a docking aircraft 36 while the hinge point 25 maintains a passable connection with the hub 14 through which passengers can move.

The hinge point 25, which allows the secondary passenger bridge 16 to pivot, makes it easier and faster to dock an aircraft 36 with the boarding pier described herein. The aircraft 36 need not be carefully parked at the boarding facility within the range of an extending aircraft adapter, such as a flexible accordion connector 28 (FIG. 1.) Rather, the aircraft need only be parked with a sill or door located along the arc that can be subscribed by one of the secondary passenger bridges 16. Preferably, the aircraft is oriented substantially tangentially to that arc subscribed by the secondary passenger bridge 16.

Figure 11:
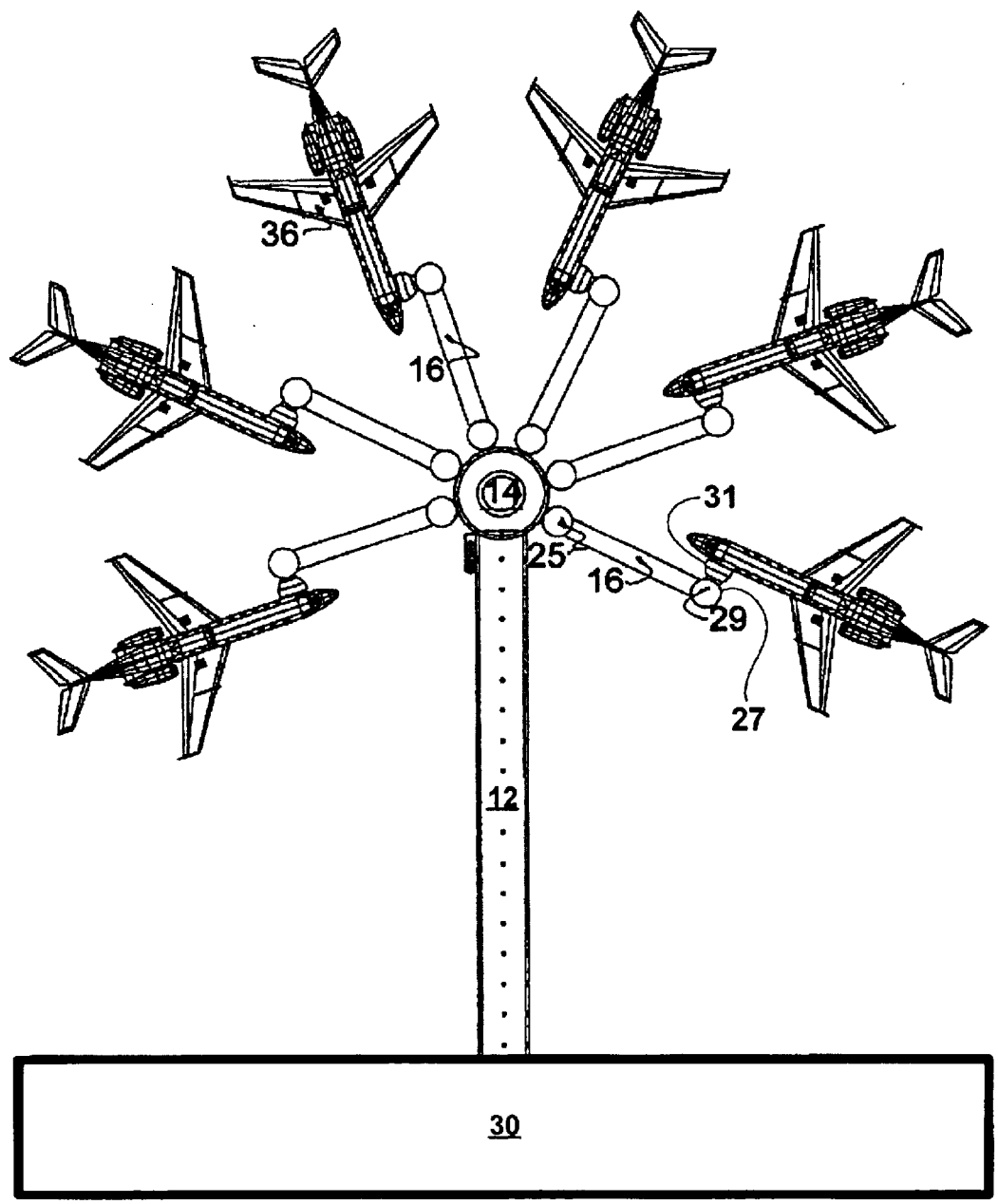
FIG. 11 is a plan view of an embodiment of the present invention in which each secondary passenger bridge pivots with respect to the hub and also has an aircraft adapter which pivots with respect to the end of the secondary passenger bridge to accommodate a docked aircraft.

FIG. 11 illustrates another embodiment of the present invention in which each secondary passenger bridge 16 extending from the hub 14 is pivotally connected to the hub 14 through a primary hinge point 25. The secondary hinge point 25 illustrated in FIG. 11 is identical to the primary hinge point described above with respect to FIG. 10, i.e., the hinge point 25 pivotally connects the secondary passenger bridge 16 to the hub 14 so that the secondary passenger bridge 16 can pivot around the primary hinge point 25.

In this way, the secondary passenger bridge 16 can be driven so that the docking end 27 of the secondary passenger bridge 16 can be swung toward or away from a docking aircraft 36. Additionally, as shown in FIG. 11, the docking end 27 of each passenger bridge 16 includes a secondary hinge point 29 that pivotally connects an aircraft adapter 31 with the docking end 27 of the secondary passenger bridge 16. Consequently, the aircraft adapter 31, which may include, for example, a flexible accordion connector 28 (FIG. 1), can be pivoted about secondary hinge point 29 with respect to the docking end of the secondary passenger bridge 16.

This further decreases the precision with which a docking aircraft 36 must be positioned with respect to the regional aircraft boarding pier of FIG. 11 and consequently decreases the time required to complete the docking. The aircraft 36 is parked with a sill or door located along the arc that can be subscribed by one of the secondary passenger bridges 16. It is not necessary, however, that the aircraft 36 be tangential or even substantially tangential to the arc. The orientation of the aircraft with respect to the arc subscribed by one of the secondary passenger bridges 16 is of little importance because the aircraft adapter can be pivoted about secondary hinge point 29 to match the orientation of the docking aircraft, thereby flexibly providing an optimal connection between the aircraft 26 and the aircraft adapter 31. Alternatively, the secondary hinge point 29 can be implemented in a secondary passenger bridge 16 without the concurrent use of a primary hinge point 25. The primary and secondary hinge points 25, 29 can be driven with hydraulics or other motor devices in a manner that will be clear to those skilled in the art.

As described above, several embodiments provide a number of significant advantages over the prior art and addresses the problems of the prior art described above. For example, where a passenger is wheelchair bound, no lift is needed to accommodate boarding and deplaning of a regional aircraft under the principles of several embodiments. Additionally, the wheelchair bound passenger can remain in a closed and conditioned space and is not subject to inclement weather or transferring to a remote concourse. Passengers have the same experience transferring between regional aircraft as has conventionally been the case transferring between large aircraft within the concourse system of a major airport. Moreover, the various design embodiments disclosed herein allow a per passenger seat cost that is competitive with large aircraft boarding bridges.

Figure 12:
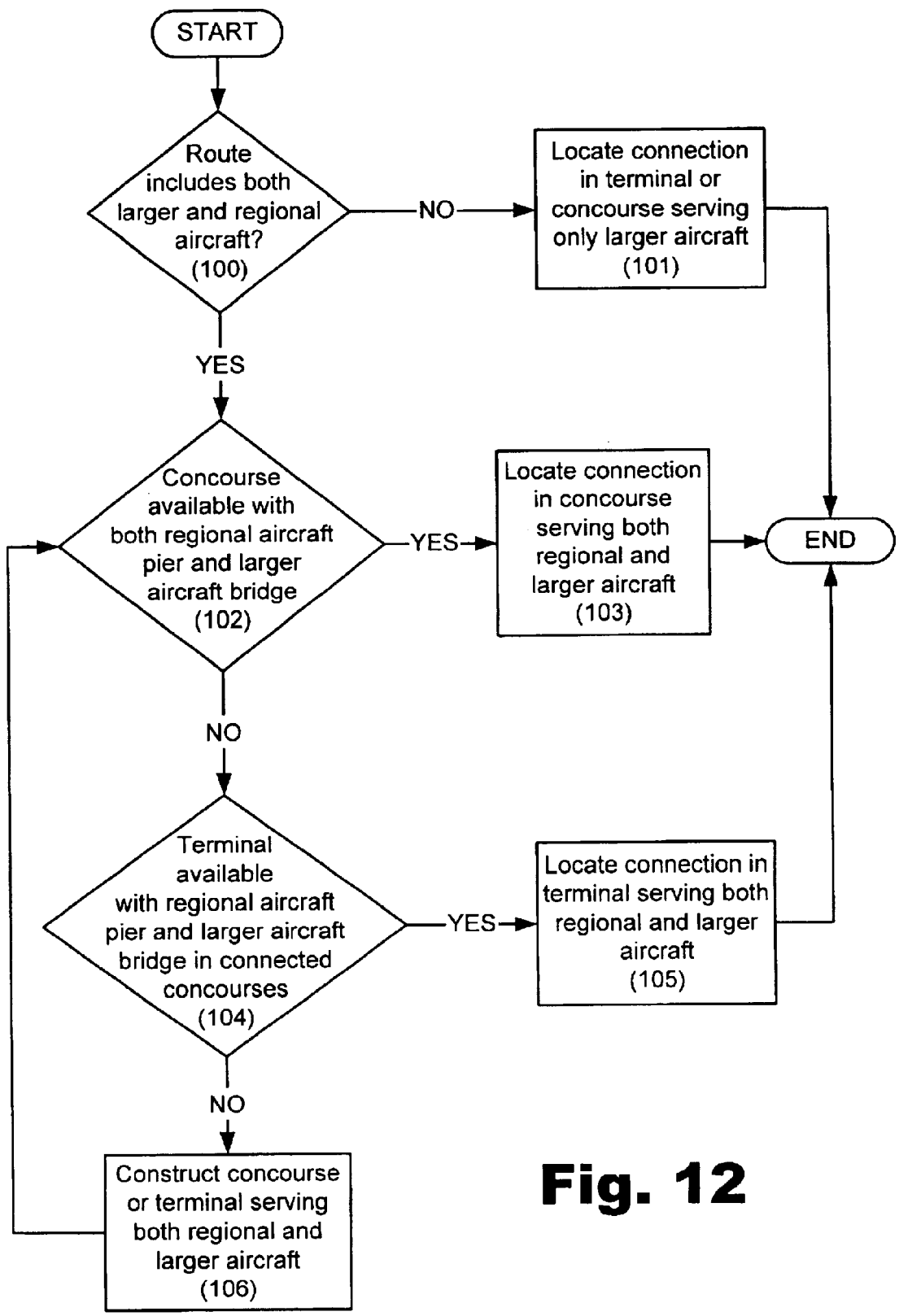
FIG. 12 is a flowchart illustrating a method according to an embodiment of the present invention of organizing an airline traffic system using the boarding structures of the present invention.

FIG. 12 is a flowchart illustrating a method according to an embodiment of organizing an airline traffic system using the boarding structures described herein. The method illustrated in FIG. 12 can be carried out by a computer or computer system and appropriate software. The creation of such a system and software will be within the ambit of one of ordinary skill in the art with the aid of this disclosure. As shown in FIG. 12, an airline may organize an air route according to an embodiment by identifying significant travel or commuter routes that involve the use of both regional and larger aircraft 100. If only larger aircraft are involved, flight connections can be located according to traditional methods 101.

If the route is serviced by a combination of regional and larger aircraft, the method next looks for an available concourse with at least one conventional larger aircraft boarding bridges and at least one regional aircraft boarding pier embodiment 102. If such a concourse is available, the airline can locate the connection between the larger aircraft and the regional aircraft in that concourse 103. Consequently, passengers on the route can transfer between the larger and regional aircraft within a single concourse. Thus, the passenger need not take extensive time or effort to travel to another location to make the flight connection. Additionally, the passenger need not be affected by inclement weather in making the connection.

If a single concourse serving both larger and regional aircraft is not available, the airline can look for a terminal (a collection of at least two interconnected concourses), which includes at least one larger aircraft boarding bridge and at least one regional aircraft boarding pier 104. If such a terminal is available, the airline can locate the connection between the larger aircraft and the regional aircraft in that terminal 105. Consequently, passengers on that route can still transfer relatively quickly and conveniently between the larger and regional aircraft that service the route.

Finally, if the appropriate facilities are not available for optimizing the flight connection on the route employing both larger and regional aircraft, the airline can consider constructing the necessary facilities according to the principles of the several embodiments 106. In one embodiment, the airline or airport authority constructs either a single concourse serving both regional and larger aircraft or a terminal of interconnected concourses serving both regional and larger aircraft.

Figure 13:
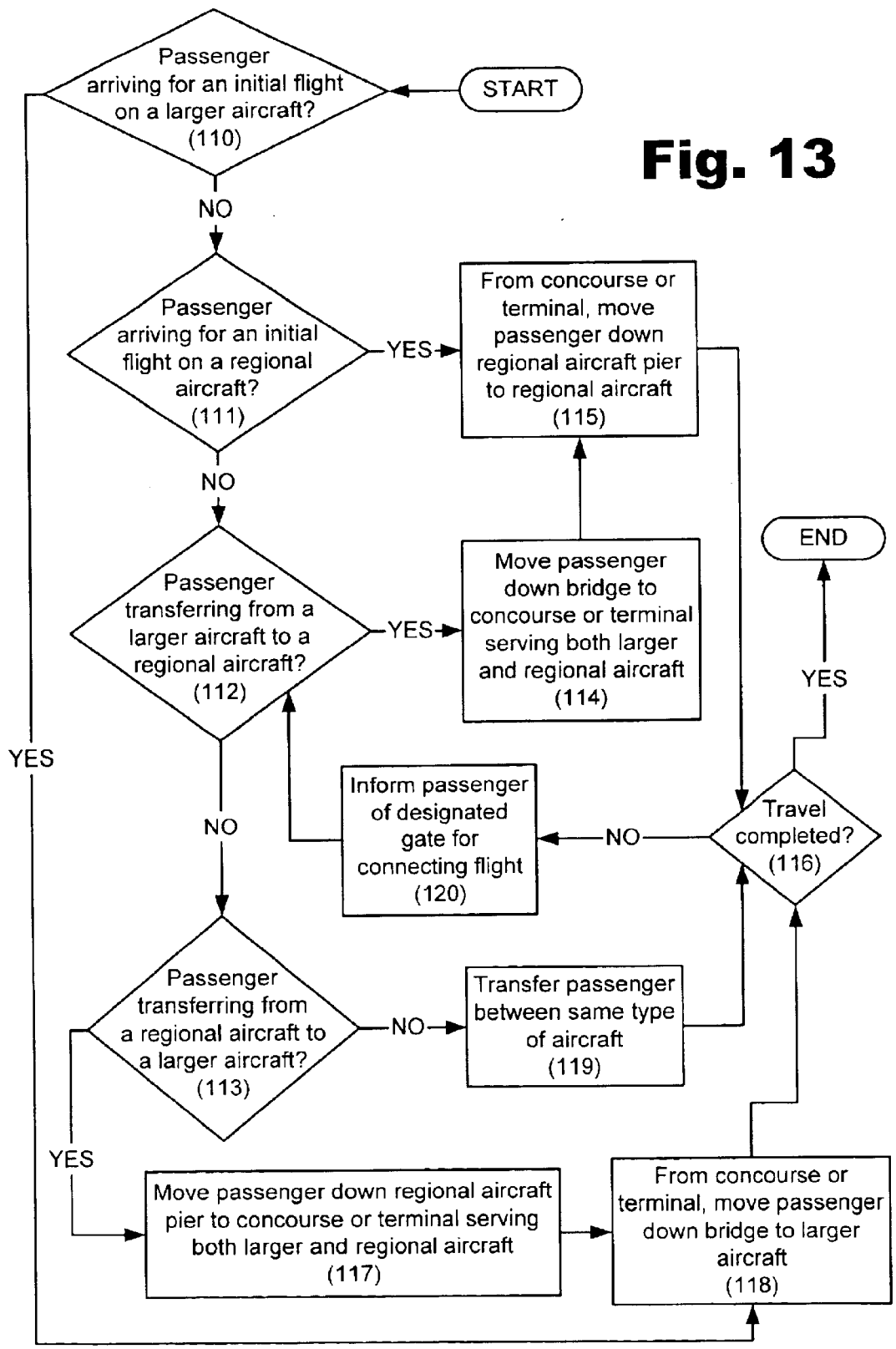
FIG. 13 is a flowchart illustrating a method according to an embodiment of the present invention of operating an airline traffic system using the boarding structures of the present invention.

Once the airline routes are in place using the method of FIG. 12, the system can be operated under the principles of the method embodiments using the method outlined in FIG. 13. FIG. 13 is a flowchart illustrating a method according to an embodiment of operating an airline traffic system using the boarding structures described herein.

As shown in FIG. 13, a passenger may arrive for an initial flight on either a larger aircraft 110 or a regional aircraft 111. If the passenger is using a larger aircraft, the passenger will be moved from the concourse or terminal down a large aircraft bridge to the appropriate aircraft 118. If the passenger is using a regional aircraft, the passenger will be moved from the concourse or terminal down a regional aircraft boarding pier to the regional aircraft 115.

After that initial flight, if the passenger's travel is completed 116, the method ends. However, if the passenger must then catch a connecting flight, the method proceeds depending on whether the passenger is transfer to a regional aircraft or a larger aircraft. In either event, the passenger is informed of the designated gate for his or her connecting flight 120.

If the passenger is transferring from a larger aircraft to a regional aircraft 112, the passenger is moved from the larger aircraft down a passenger bridge to the concourse or terminal that serves both larger and regional aircraft 114. The passenger is made aware of a gate assignment for his or her connecting flight on a regional aircraft. The passenger then goes to the regional aircraft pier, as described above, and moves from the concourse or terminal down the pier to the designated regional aircraft 115.

If the passenger is transferring from a regional aircraft to a larger aircraft 113, the passenger is moved from the regional aircraft down a regional aircraft pier, as described above, to the concourse or terminal that serves both larger and regional aircraft 117. The passenger is made aware of a gate assignment for his or her connecting flight on a larger aircraft. The passenger then goes to the designated passenger bridge for the larger aircraft and moves from the concourse or terminal down the bridge to the aircraft 118.

Alternatively, the passenger may be transferring between regional aircraft or between larger aircraft 119. Where this is the case, the transfer is made using the appropriate type of bridge or pier to deplane the passenger and board the passenger to the connecting aircraft.

When travel is completed 116, the process ends. Otherwise, the process can continue with the passenger making as many connections as necessary between any combination of regional and larger aircraft.

Consequently, an embodiment provides airlines with an improved method of routing, moving, deplaning and boarding passengers with routes that include the use of both regional and larger aircraft. The time required to move between planes of different size types is minimized and the effects of inclement weather and the inconvenience to disabled passengers are also minimized.

Figure 14:
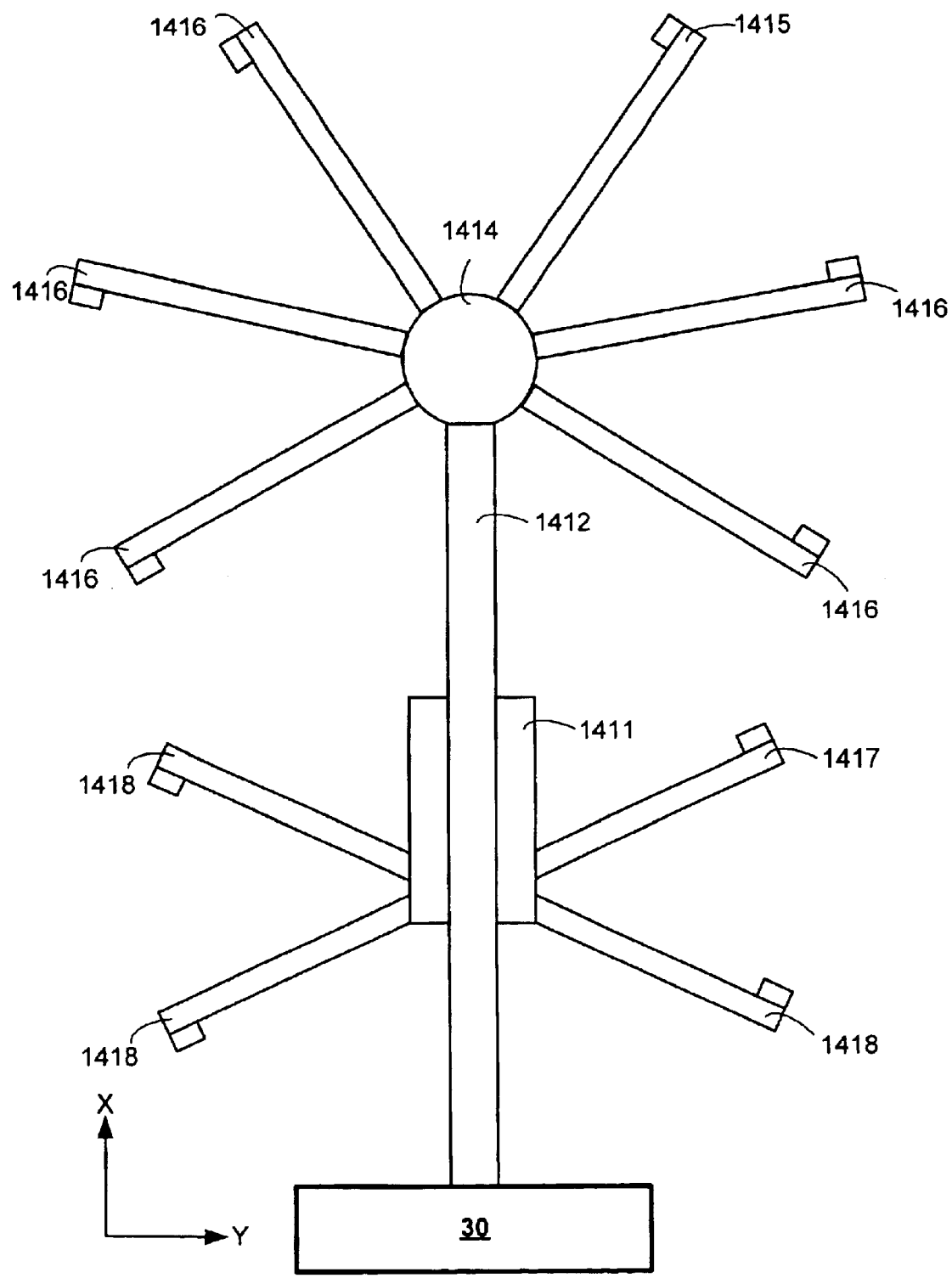
FIG. 14 is a plan view of a terminal including a regional aircraft boarding pier includes more than one docking zones, each for at least two regional aircraft.

FIG. 14 is a plan view of a regional aircraft boarding pier according to an embodiment. Where space allows on the apron, more than six docking stations can be configured. In FIG. 14 by way of non-limiting example, a terminal 30 is the origination of a regional aircraft boarding pier 1400 which is referred to as a "ten-pack" regional aircraft boarding pier 1400. By "ten-pack" it is intended that about ten secondary regional aircraft passenger bridges are disposed along the regional aircraft boarding pier 1400. By "ten-gate" regional aircraft boarding pier 1400, it is understood that exactly ten secondary regional aircraft passenger bridges are disposed along the regional aircraft boarding pier 1400.

According to an embodiment, a primary regional aircraft passenger bridge 1412 leads from the terminal 30, to a hub 1414. In this embodiment the primary regional aircraft passenger bridge 1412 is referred to as a first primary regional aircraft passenger bridge 1412. Somewhere along the extent of the regional boarding pier 1400, a second primary regional aircraft passenger bridge 1411 leads from the first primary regional aircraft passenger bridge 1412.

Of the about ten secondary regional aircraft passenger bridges, about six of them are terminal end secondary regional aircraft passenger bridges 1416 and about four of them are mid-pier secondary regional aircraft passenger bridges 1418. In one embodiment by way of non-limiting example, at least one secondary regional aircraft passenger bridge is a large-aircraft passenger bridge 1415 such as one of the passenger bridges which is at or near the terminal end of a given regional aircraft boarding pier 1400. In one embodiment, the difference between the terminal-end secondary regional aircraft passenger bridge 1416 and the terminal-end large-aircraft passenger bridge 1415 is a structural difference which accommodates the various regional or large aircraft such as is disclosed in one embodiment relating to the structure depicted in FIG. 8. In one embodiment, the difference is a mere designational difference, which can include, however, an elongating, telescoping secondary regional aircraft passenger bridge 1415.

In another embodiment by way of non-limiting example, at least one mid-pier secondary regional aircraft passenger bridge can be a large-aircraft passenger bridge 1417 as depicted in FIG. 14. In one embodiment, the difference between the mid-pier secondary regional aircraft passenger bridge 1418 and the mid-pier large-aircraft passenger bridge 1417 is a structural difference, which accommodates the various regional- or large aircraft. In one embodiment, the difference is a mere designational difference.

By reading this disclosure, one of ordinary skill in the art can achieve a "nine-pack", a "ten-pack" and other boarding piers such as a "twelve-pack", a "fourteen-pack", a "sixteen-pack", an "eighteen-pack", and greater or lesser numbers, are within the scope of this disclosure. The number of secondary regional aircraft passenger bridges can be selected depending upon a specific set of circumstances such as tarmac space available, specific aircraft types which dock at a given regional aircraft boarding pier, and others.

Figure 15:
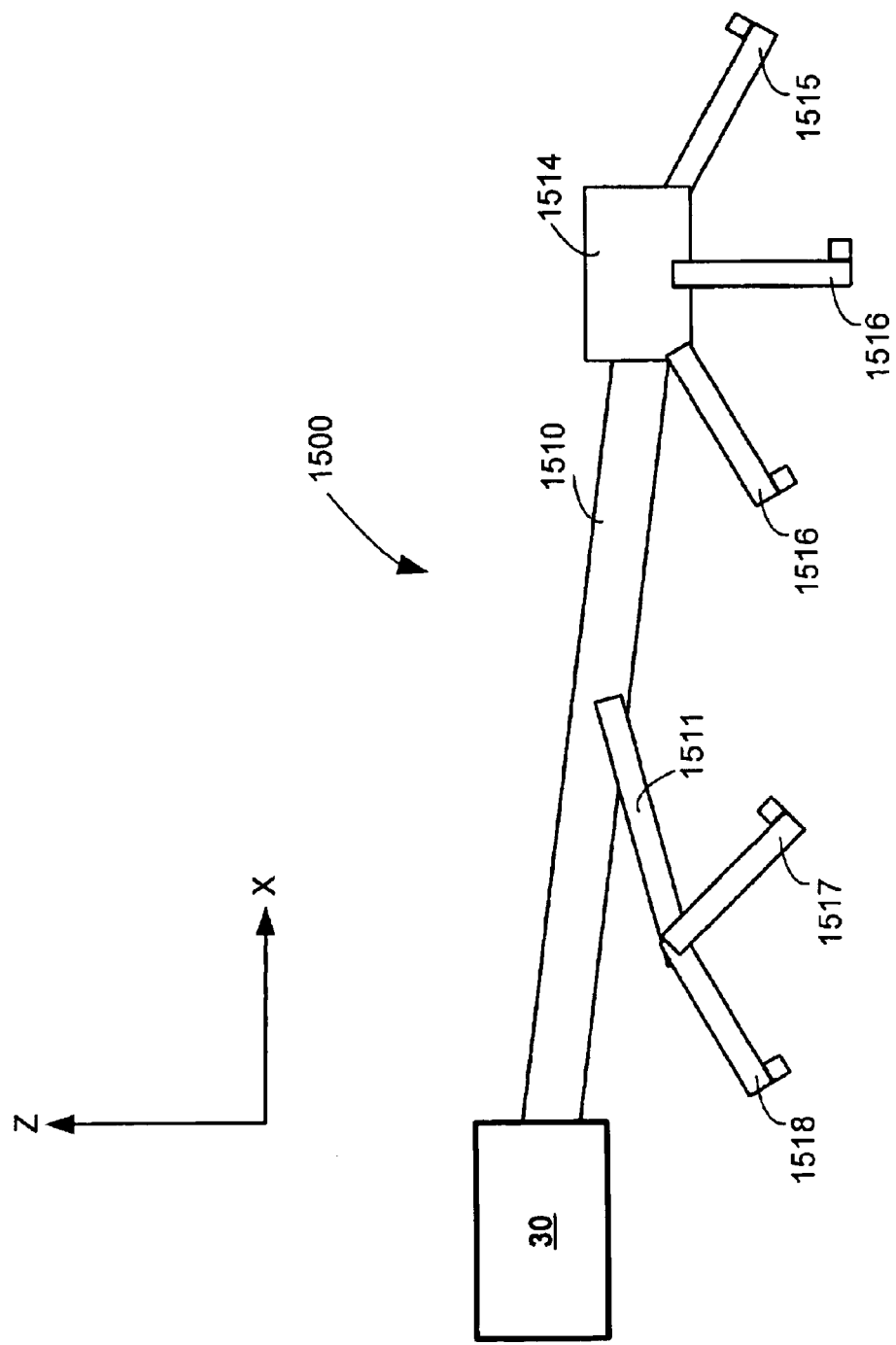
FIG. 15 is a side elevation of the regional aircraft boarding pier depicted in FIG. 14.

FIG. 15 is a side elevation of the regional aircraft boarding pier depicted in FIG. 14 according to an embodiment. The regional aircraft boarding pier 1500 is depicted in FIG. 15 in the X-Z plane, in contrast with the regional aircraft boarding pier 1400 depicted in the X-Y plane. In the X-Z plane, a negative slope is depicted for the first primary regional aircraft passenger bridge 1512, and likewise a negative slope is depicted for the second primary regional aircraft passenger bridge 1511. In this embodiment, the negative slopes are configured to lead from a terminal 30 which can accommodate both a large aircraft passenger bridge (not pictured) and a regional aircraft boarding pier 1500. In FIG. 15, no tarmac support is illustrated for the regional aircraft boarding pier 1500 for simplicity. Tarmac support, however, can be provided at a location which facilitates the structure of the regional aircraft boarding pier 1500, such as at the terminal 30, at the terminal pier hub 1514, and optionally at the location, and at the intersection of the mid-pier secondary regional aircraft passenger bridge 1518 and the mid-pier secondary regional aircraft passenger bridge 1517.

According to an embodiment, the first primary regional aircraft passenger bridge 1512 leads from the terminal 30, to the hub 1514. In this embodiment, somewhere along the length of the boarding pier 1500, the second primary regional aircraft passenger bridge 1511 leads from the first primary regional aircraft passenger bridge 1512.

Of the about ten secondary regional aircraft passenger bridges, about five are depicted in FIG. 15. As set forth in FIG. 14 by way of non-limiting example, at least one secondary regional aircraft passenger bridge can be a large-aircraft passenger bridge 1515 such as one of the passenger bridges which is at or near the terminal end of the regional aircraft boarding pier 1500. In one embodiment, the difference between the terminal-end secondary regional aircraft passenger bridge 1516 and the terminal-end large-aircraft passenger bridge 1515 is a structural difference, which accommodates the various regional- or large aircraft. In one embodiment, the difference is a mere designational difference.

In another embodiment by way of non-limiting example, at least one mid-pier secondary regional aircraft passenger bridge can be a large-aircraft passenger bridge 1517 as depicted in FIG. 15. In one embodiment, the difference between the mid-pier secondary regional aircraft passenger bridge 1418 and the mid-pier large-aircraft passenger bridge 1417 is a structural difference, which accommodates the various regional- or large aircraft. In one embodiment, the difference is a mere designational difference.

Figure 16:
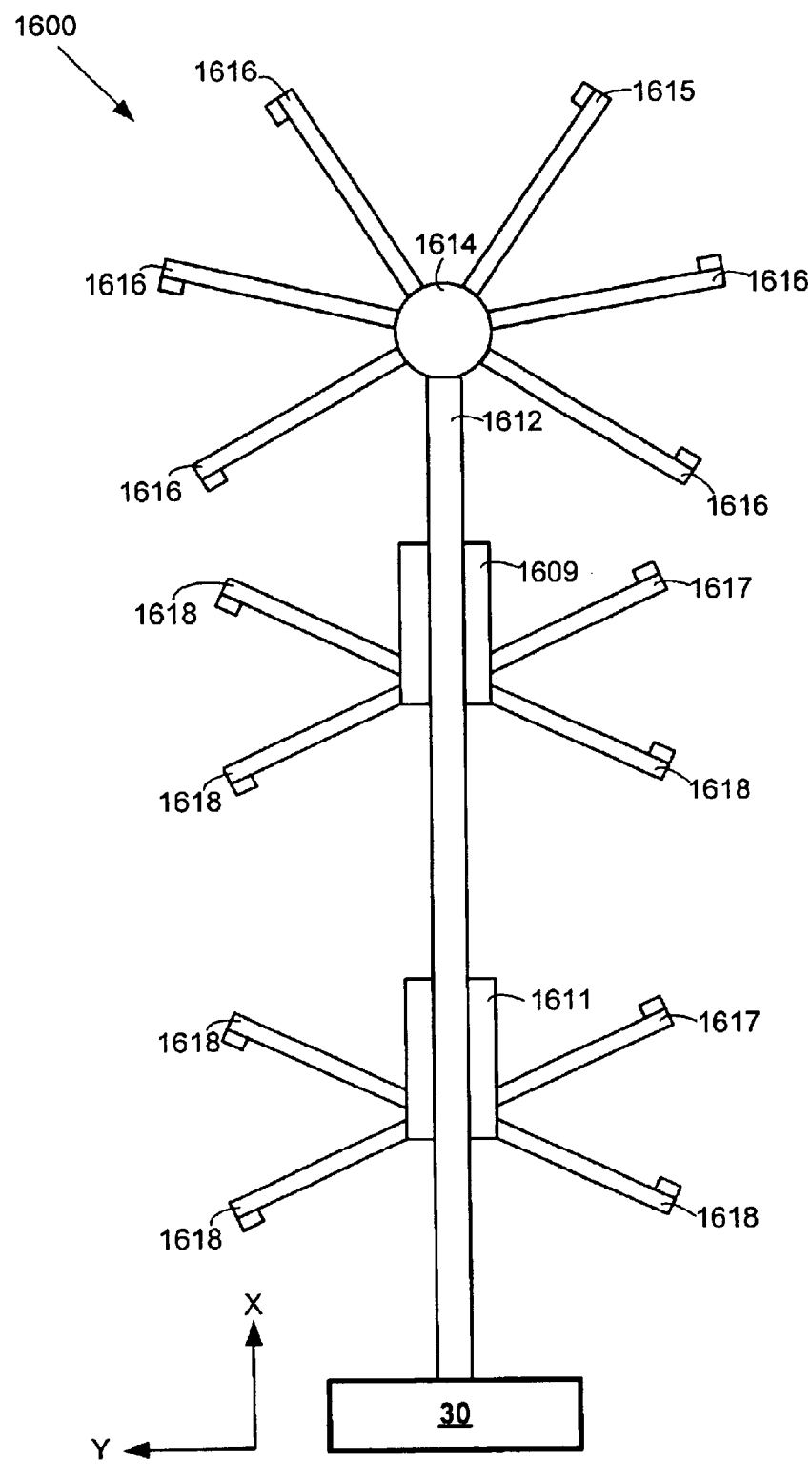
FIG. 16 is an illustrative embodiment of a regional aircraft boarding pier.

FIG. 16 is an illustrative embodiment of a regional aircraft boarding pier. FIG. 16 is an illustrative embodiment of a "fourteen-pack" regional aircraft boarding pier 1600. As depicted in FIG. 16, a "fourteen-pack" illustrates about fourteen secondary regional aircraft passenger bridges with various designations 1615, 1616, 1617, and 1618 according to the terminology set forth for the embodiments described in FIGS. 14 and 15. Further, a first primary regional aircraft passenger bridge 1612 and two occurrences of a second primary regional aircraft passenger bridge, 1609 and 1611, are depicted to facilitate access to about eight regional aircraft, and optionally at least one large aircraft.

Figure 17:
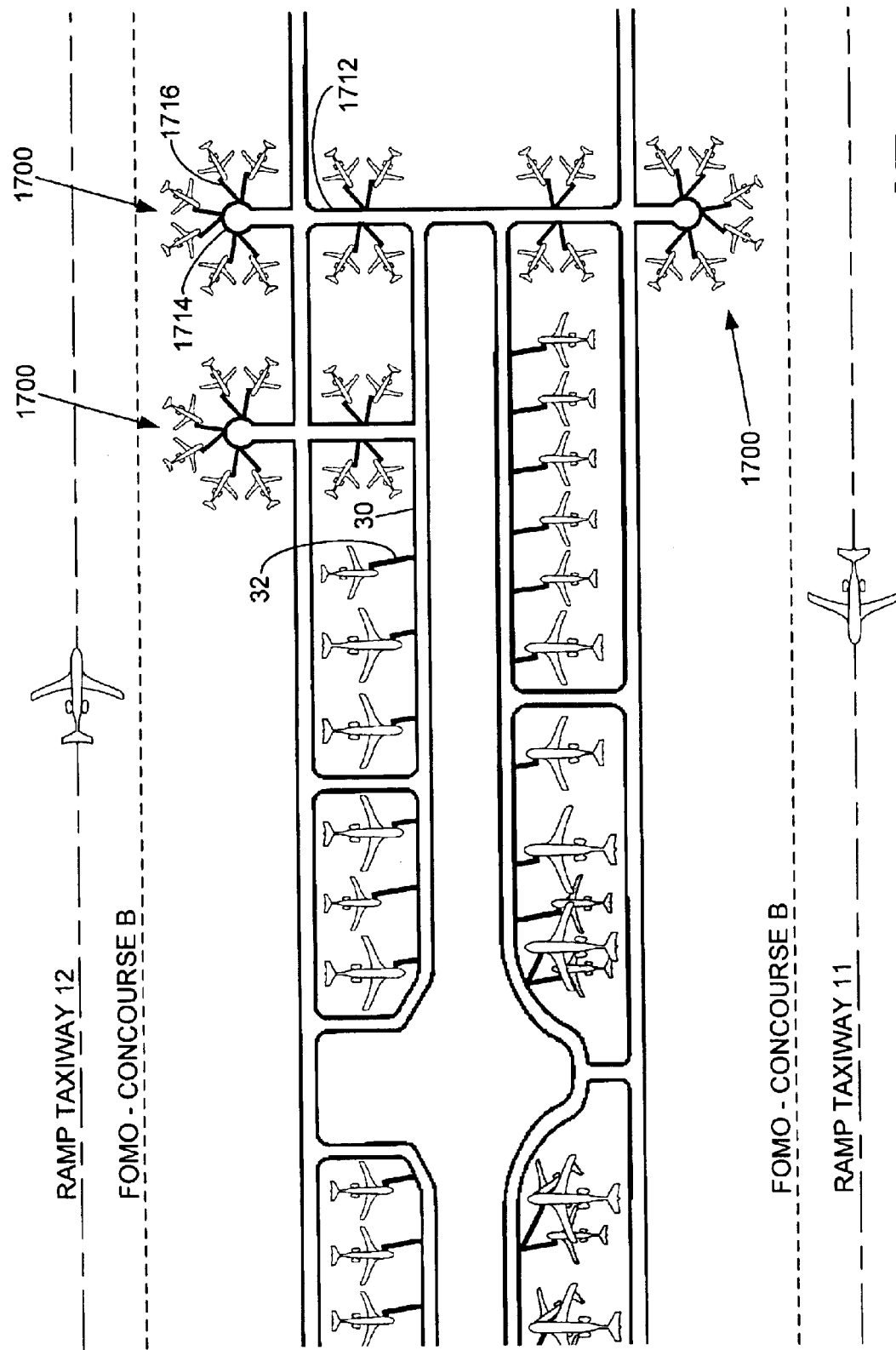
FIG. 17 illustrates integration of at least one regional aircraft boarding pier with an existing terminal.

FIG. 17 illustrates integration of at least one regional aircraft boarding pier with an existing terminal. FIG. 17 illustrates integration of at least one "ten-pack" regional aircraft boarding pier 1700 with an existing terminal 30. In this embodiment, about three "ten-pack" regional aircraft boarding piers 1700 are integrated with a large aircraft passenger bridge 32. The regional aircraft boarding pier 1700 includes a primary regional aircraft passenger bridge 1712, and a plurality of secondary regional aircraft passenger bridges 1716, which extend from a pier hub 1714. For clarity, the primary regional aircraft passenger bridge 1712, and the plurality of secondary regional aircraft passenger bridges 1716 are designated on only one of the regional aircraft boarding piers 1700, but similar structures are depicted on the other regional aircraft boarding piers 1700.

Figure 18:
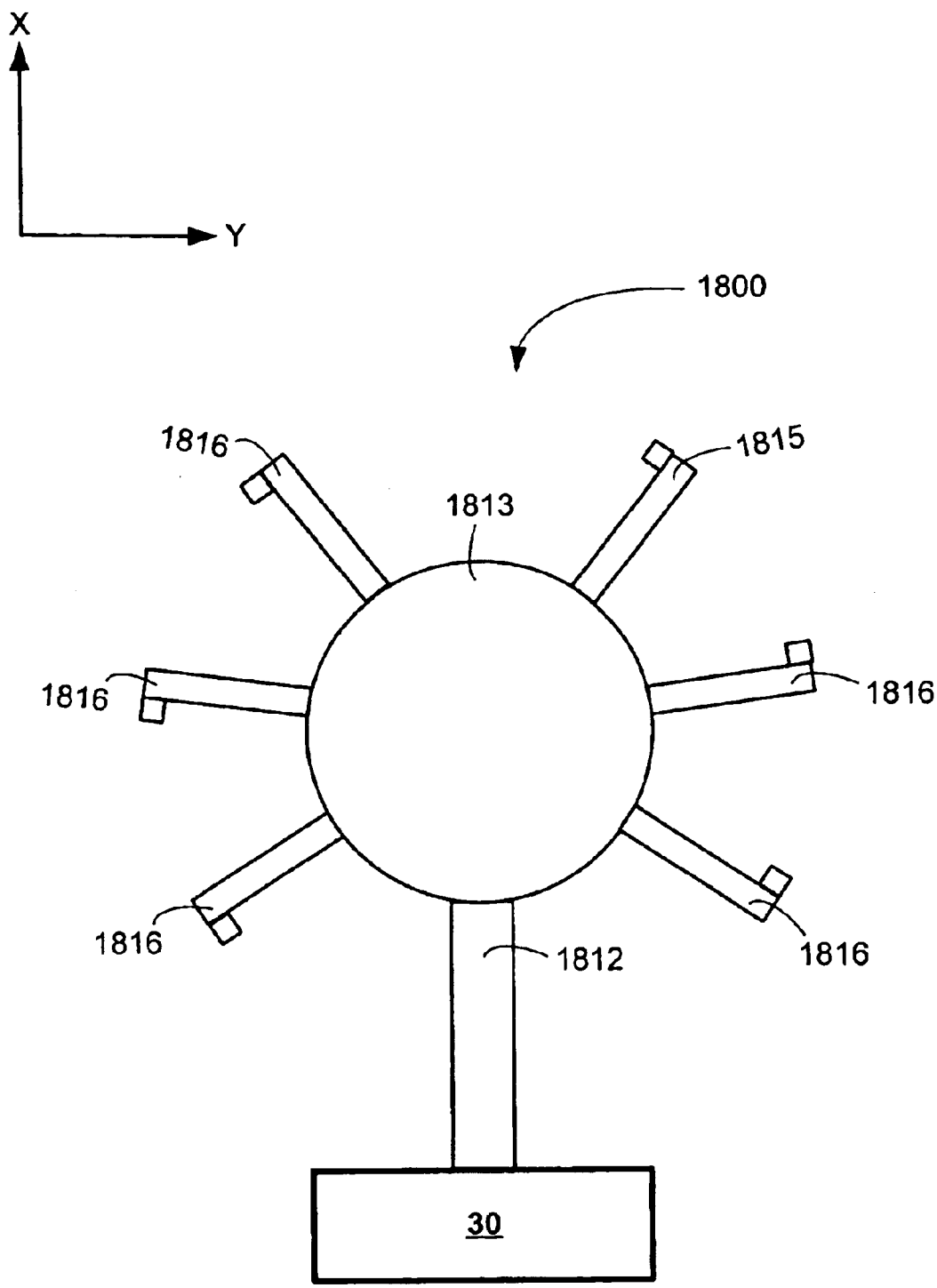
FIG. 18 illustrates another embodiment of a regional aircraft boarding pier.

FIG. 18 illustrates another embodiment of a regional aircraft boarding pier. The regional aircraft boarding pier 1800 includes a primary regional aircraft passenger bridge 1812 and a plurality of secondary passenger bridges 1815, 1816 connected to, and extending from, the pier hub 1813. At least one of the secondary passenger bridges 1816 includes a docking end for docking with a regional aircraft. Optionally, a secondary passenger bridge 1815 includes a docking end for docking with a large aircraft.

Figure 19:
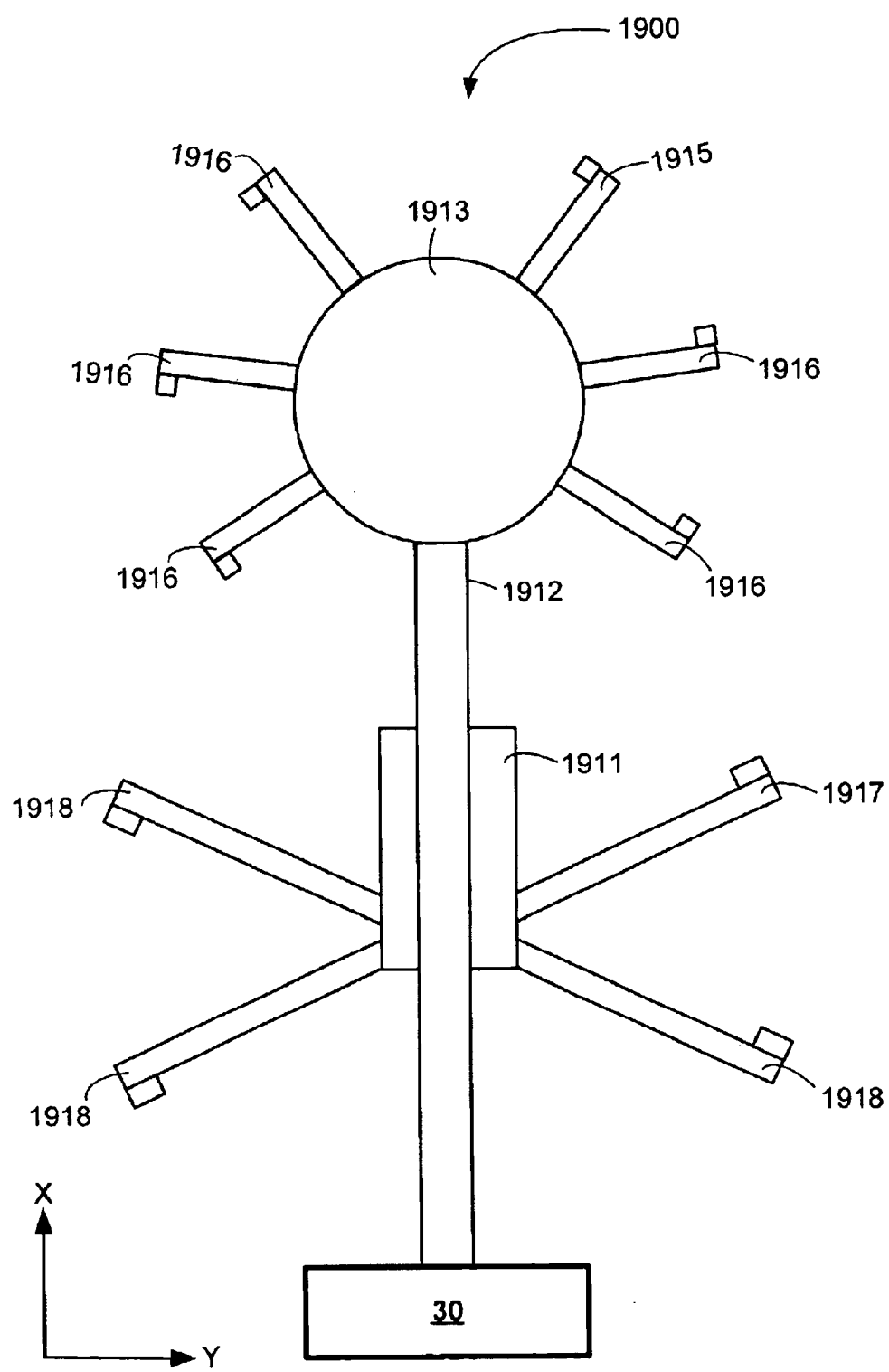
FIG. 19 illustrates another embodiment where a terminal is an origination of a regional aircraft boarding pier.

In this embodiment, the pier hub 1813 contains at least one passenger amenities facility. In one embodiment, a passenger amenities facility includes a restroom. In one embodiment, a passenger amenities facility includes a shop such as a snack bar or a newsstand. In one embodiment, a passenger amenities facility includes a passenger waiting area that provides seating. In one embodiment, a passenger amenities facility includes a communications center such as a telephone connection or an Internet connection. In one embodiment, a passenger amenities facility includes a security screening area. In one embodiment, a passenger amenities facility includes at least two of the above. FIG. 19 illustrates another embodiment. In FIG. 19 by way of non-limiting example, a terminal 30 is an origination of a regional aircraft boarding pier 1900 which is referred to as a "ten-pack" regional aircraft boarding pier 1900. By "ten-pack," it is intended that about ten boarding locations are disposed along the regional aircraft boarding pier 1900.

According to an embodiment, a primary regional aircraft passenger bridge 1912 leads from the terminal 30, to a hub 1913. In this embodiment the primary regional aircraft passenger bridge 1912 is referred to as a first primary regional aircraft passenger bridge 1912. Somewhere along the boarding pier 1900, a second primary regional aircraft passenger bridge 1911 leads from the first primary regional aircraft passenger bridge 1912 according to the embodiment depicted in FIGS. 14 an 15.

Of the about ten secondary regional aircraft passenger bridges, about six of them are terminal end secondary regional aircraft passenger bridges 1916 and about four of them are mid-pier secondary regional aircraft passenger bridges 1918. In one embodiment by way of non-limiting example, at least one secondary regional aircraft passenger bridge can be a large-aircraft passenger bridge 1915 such as one of the passenger bridges which is at or near the terminal end of a given regional aircraft boarding pier 1900. In one embodiment, the difference between the terminal-end secondary regional aircraft passenger bridge 1916 and the terminal-end large-aircraft passenger bridge 1915 is a structural difference. In one embodiment, the difference is a mere designational difference.

In another embodiment by way of non-limiting example, at least one mid-pier secondary regional aircraft passenger bridge can be a large-aircraft passenger bridge 1917 as depicted in FIG. 19. In one embodiment, the difference between the mid-pier secondary regional aircraft passenger bridge 1918 and the mid-pier large-aircraft passenger bridge 1917 is a structural difference, which accommodates the various regional- or large aircraft. In one embodiment, the difference is a mere designational difference.

In one embodiment, the pier hub 1913 includes at least one passenger amenities facility as set forth herein. Accordingly, pedestrian passenger congestion in the concourse 30 can be alleviated by advancing at least some of the passengers who are boarding and/or transferring at the boarding pier 1900 out of the concourse 30.

Figure 20:
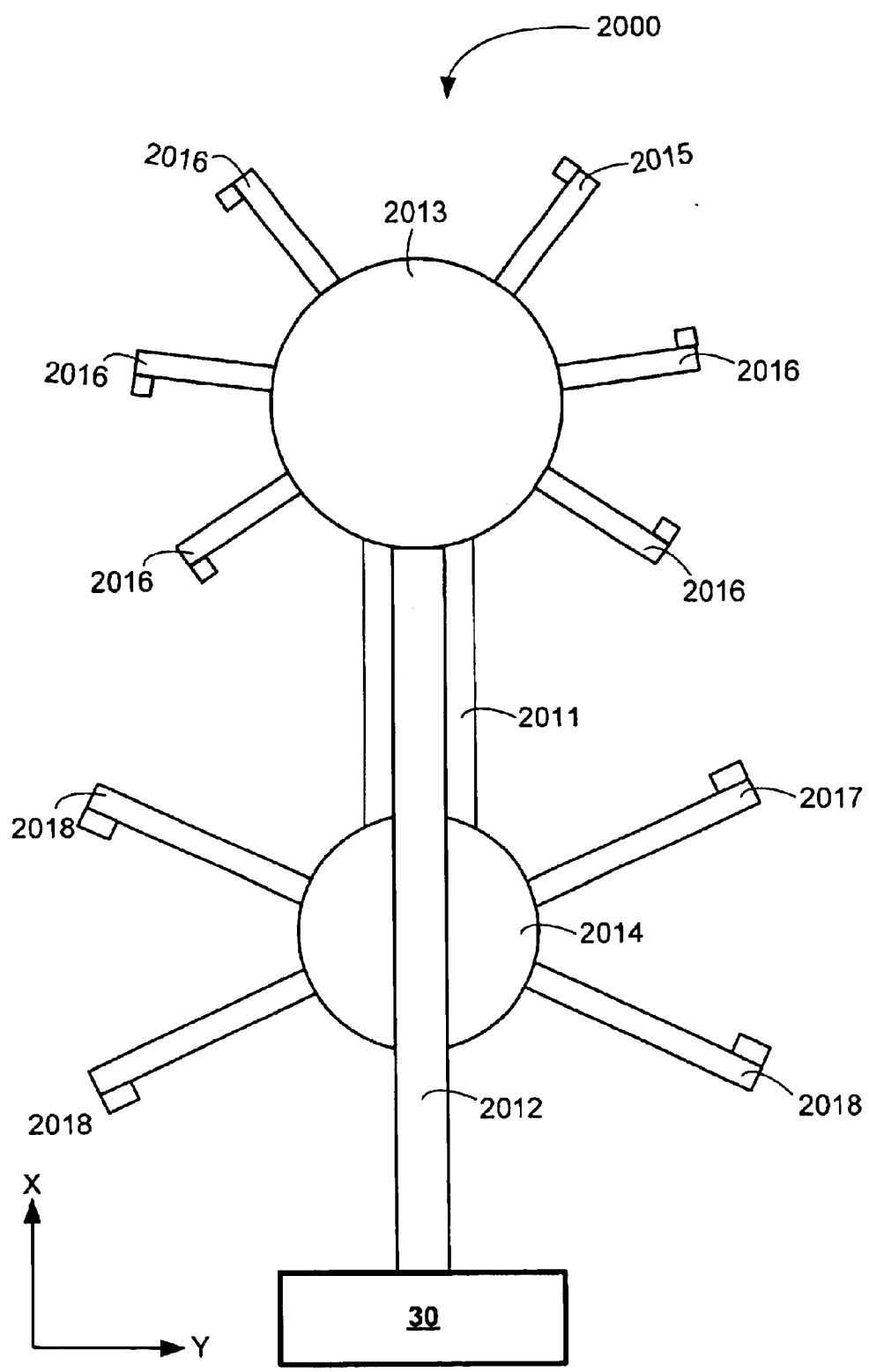
FIG. 20 illustrates another embodiment where a terminal is an origination of a regional aircraft boarding pier.

FIG. 20 illustrates another embodiment. In FIG. 20 by way of non-limiting example, a terminal 30 is an origination of a regional aircraft boarding pier 2000 which is referred to as a "ten-pack" regional aircraft boarding pier 2000. By "ten-pack," it is intended that about ten boarding locations are disposed along the regional aircraft boarding pier 2000.

According to an embodiment, a primary regional aircraft passenger bridge 2012 leads from the terminal 30, to a hub 2013. In this embodiment the primary regional aircraft passenger bridge 2012 is referred to as a first primary regional aircraft passenger bridge 2012. Somewhere along the boarding pier 2000, a second primary regional aircraft passenger bridge 2011 connects the hub 2013 to a mid-pier hub 2014.

Of the about ten boarding locations, about six of them are terminal end secondary regional aircraft passenger bridges 2016 and about four of them are mid-pier secondary regional aircraft passenger bridges 2018. In one embodiment by way of non-limiting example, at least one secondary regional aircraft passenger bridge can be a large-aircraft passenger bridge 2015 such as one of the passenger bridges which is at or near the terminal end of a given regional aircraft boarding pier 2000. In one embodiment, the difference between the terminal-end secondary regional aircraft passenger bridge 2016 and the terminal-end large-aircraft passenger bridge 2015 is a structural difference, which accommodates the various regional- or large aircraft. In one embodiment, the difference is a mere designational difference.

In another embodiment by way of non-limiting example, at least one mid-pier secondary regional aircraft passenger bridge can be a large-aircraft passenger bridge 2017 as depicted in FIG. 20. In one embodiment, the difference between the mid-pier secondary regional aircraft passenger bridge 2018 and the mid-pier large-aircraft passenger bridge 2017 is a structural difference. In one embodiment, the difference is a mere designational difference.

In one embodiment, the pier hub 2013 includes at least one passenger amenities facility as set forth herein. Similarly, the mid-pier hub 2104, although depicted as smaller by way of non-limiting example, can also include at least one passenger amenities facility as set forth herein. Accordingly, pedestrian passenger congestion in the concourse 30 can be alleviated by advancing at least some of the passengers who are boarding and/or transferring at the boarding pier 2000 out of the concourse 30.

Figure 21:
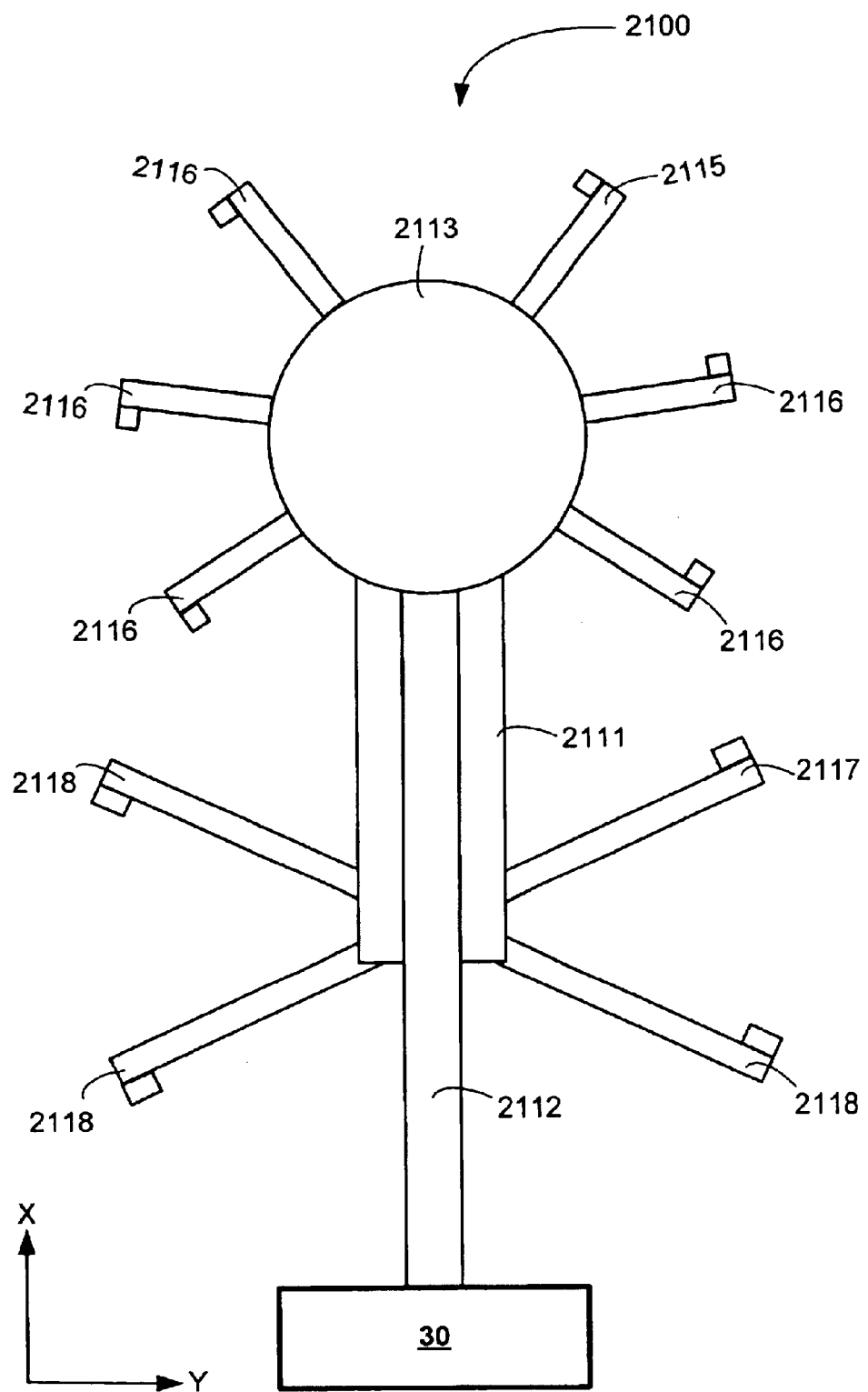
FIG. 21 illustrates another embodiment where a terminal is an origination of a regional aircraft boarding pier.

FIG. 21 illustrates another embodiment. In FIG. 21 by way of non-limiting example, a terminal 30 is an origination of a regional aircraft boarding pier 2100 which is referred to as a "ten-pack" regional aircraft boarding pier 2100. By "ten-pack," it is intended that about ten boarding locations are disposed along the regional aircraft boarding pier 2100.

According to an embodiment, a primary regional aircraft passenger bridge 2112 leads from the terminal 30, to a hub 2113. In this embodiment the primary regional aircraft passenger bridge 2112 is referred to as a first primary regional aircraft passenger bridge 2112. At the hub 2113, a second primary regional aircraft passenger bridge 2011 connects the hub 2013 to a plurality of secondary regional aircraft passenger bridges 2017, 2018.

Of the about ten boarding locations, about six of them are terminal end secondary regional aircraft passenger bridges 2116 and about four of them are mid-pier secondary regional aircraft passenger bridges 2118. In one embodiment by way of non-limiting example, at least one secondary regional aircraft passenger bridge can be a large-aircraft passenger bridge 2115 such as one of the passenger bridges which is at or near the terminal end of a given regional aircraft boarding pier 2100. In one embodiment, the difference between the terminal-end secondary regional aircraft passenger bridge 2116 and the terminal-end large-aircraft passenger bridge 2115 is a structural difference, which accommodates the various regional- or large aircraft. In one embodiment, the difference is a mere designational difference.

In another embodiment by way of non-limiting example, at least one mid-pier secondary regional aircraft passenger bridge can be a large-aircraft passenger bridge 2117 as depicted in FIG. 21. In one embodiment, the difference between the mid-pier secondary regional aircraft passenger bridge 2118 and the mid-pier large-aircraft passenger bridge 2117 is a structural difference, which accommodates the various regional- or large aircraft. In one embodiment, the difference is a mere designational difference.

In one embodiment, the pier hub 2113 includes at least one passenger amenities facility as set forth herein. In this embodiment, the pier hub 2113 is the only location along the regional aircraft boarding pier 2100, which includes at least one passenger amenities facility 2113. Accordingly, pedestrian passenger congestion in the concourse 30 can be alleviated by advancing at least some of the passengers who are boarding and/or transferring at the regional aircraft boarding pier 2100 out of the concourse 30.

Figure 22:
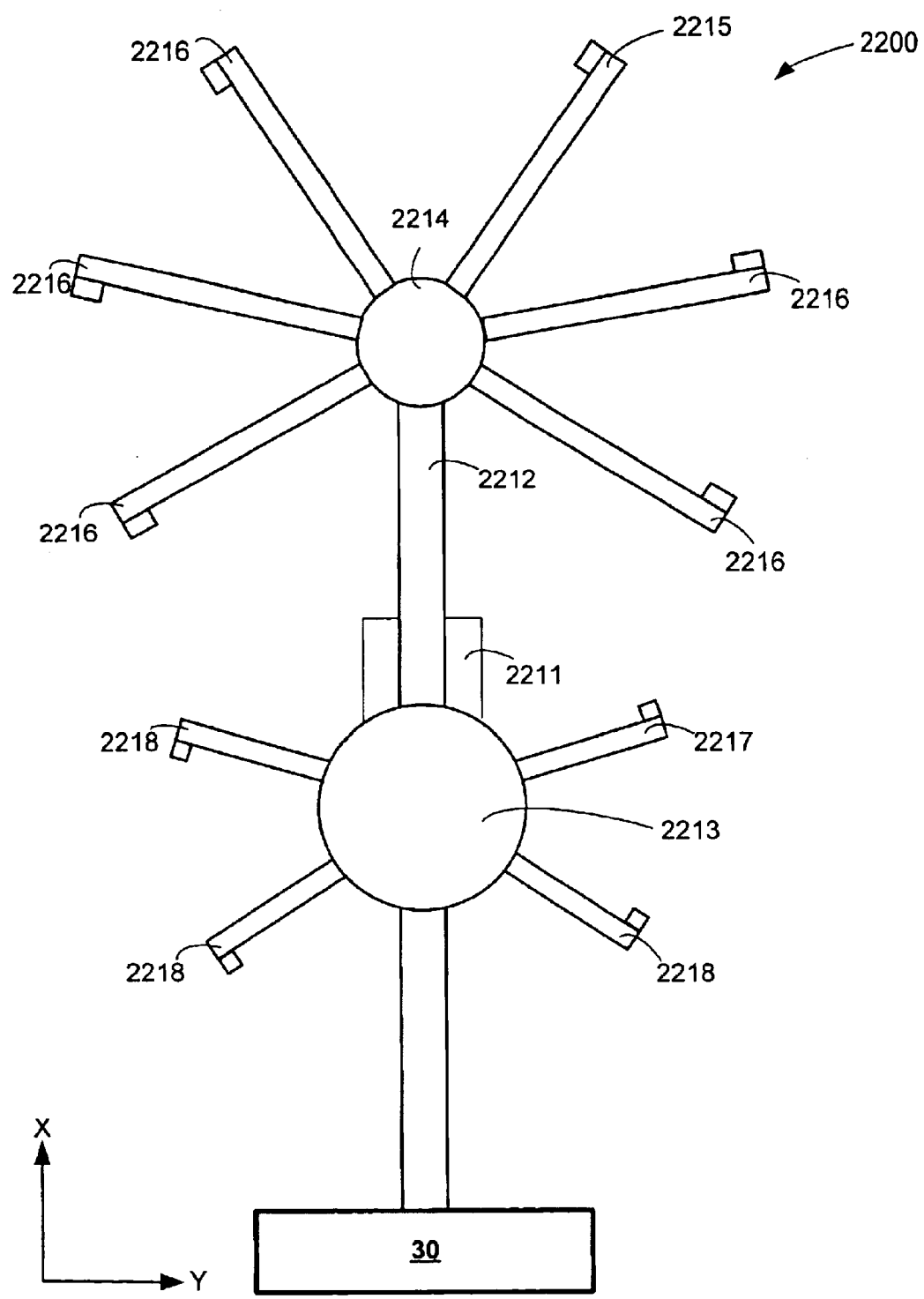
FIG. 22 illustrates another embodiment where a terminal is an origination of a regional aircraft boarding pier.

FIG. 22 illustrates another embodiment. In FIG. 22 by way of non-limiting example, a terminal 30 is an origination of a regional aircraft boarding pier 2200 which is referred to as a "ten-pack" regional aircraft boarding pier 2200. By "ten-pack" it is intended that about ten boarding locations are disposed along the regional aircraft boarding pier 2200.

According to an embodiment, a first primary regional aircraft passenger bridge 2212 leads from the terminal 30, to a hub 2214. In this embodiment the primary regional aircraft passenger bridge 2212 is referred to as a first primary regional aircraft passenger bridge 2212. Somewhere along the first primary regional aircraft passenger bridge 2212, a second primary regional aircraft passenger bridge 2211 leads back to a mid-pier hub 2213. At the mid-pier hub 2213, a plurality of secondary regional aircraft passenger bridges 2217, 2218 extend therefrom.

Of the about ten boarding locations, about six of them are terminal end secondary regional aircraft passenger bridges 2216 and about four of them are mid-pier secondary regional aircraft passenger bridges 2218. In one embodiment by way of non-limiting example, at least one secondary regional aircraft passenger bridge can be a large-aircraft passenger bridge 2215 such as one of the passenger bridges which is at or near the terminal end of a given regional aircraft boarding pier 2200. In one embodiment, the difference between the terminal-end secondary regional aircraft passenger bridge 2216 and the terminal-end large-aircraft passenger bridge 2215 is a structural difference, which accommodates the various regional- or large aircraft. In one embodiment, the difference is a mere designational difference.

In another embodiment by way of non-limiting example, at least one mid-pier secondary regional aircraft passenger bridge can be a large-aircraft passenger bridge 2217 as depicted in FIG. 22. In one embodiment, the difference between the mid-pier secondary regional aircraft passenger bridge 2218 and the mid-pier large-aircraft passenger bridge 2217 is a structural difference, which accommodates the various regional- or large aircraft. In one embodiment, the difference is a mere designational difference.

In one embodiment, the mid-pier pier hub 2213 includes at least one passenger amenities facility as set forth herein. In this embodiment, the mid-pier pier hub 2213 is the only location along the regional aircraft boarding pier 2200, which includes at least one passenger amenities facility. Accordingly, pedestrian passenger congestion in the concourse 30 can be alleviated by advancing at least some of the passengers who are boarding and/or transferring at the regional aircraft boarding pier 2200 out of the concourse 30.

Figure 23:
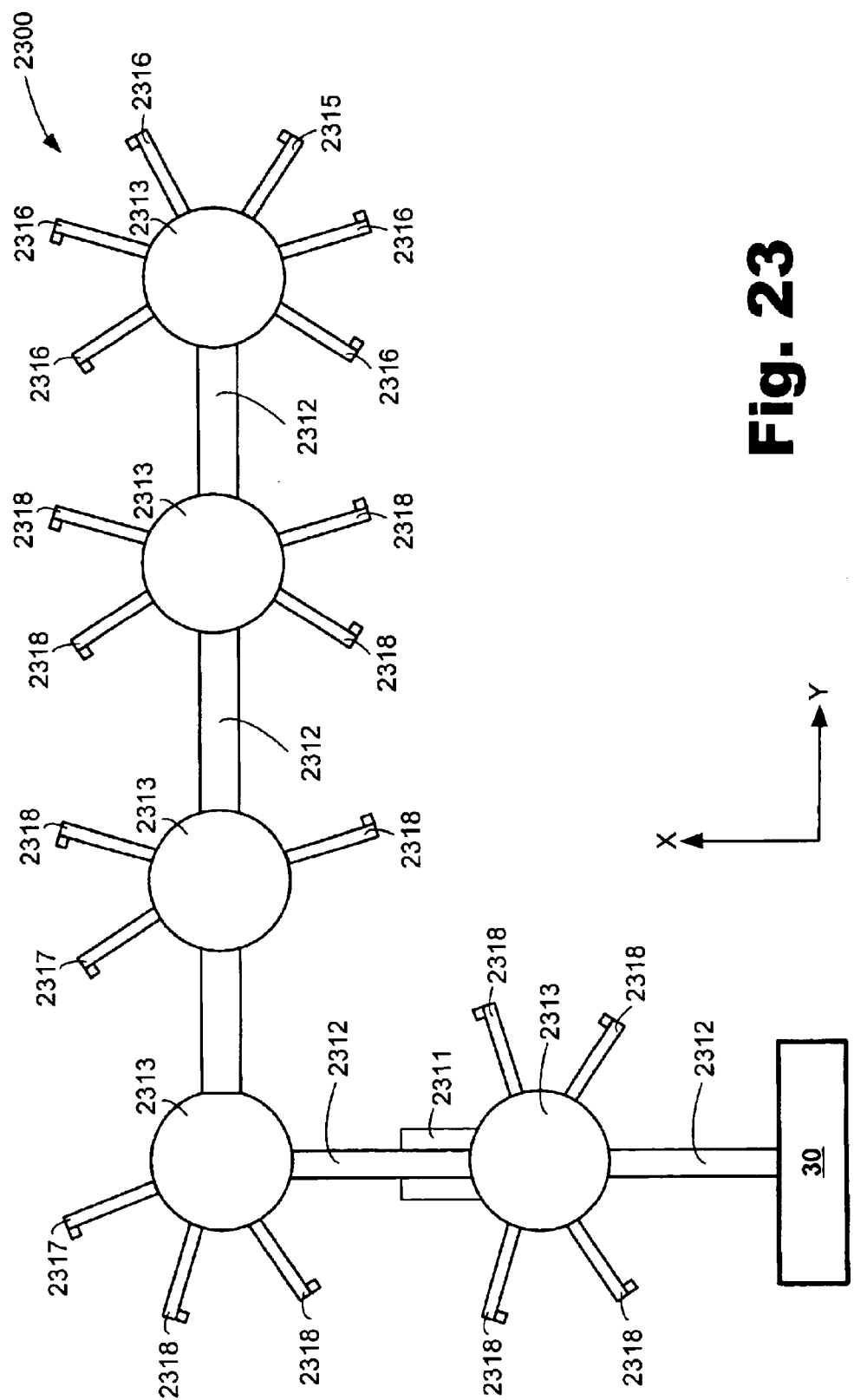
FIG. 23 illustrates another embodiment where a terminal is an origination of a regional aircraft boarding pier.

FIG. 23 illustrates another embodiment. In FIG. 23 by way of non-limiting example, a terminal 30 is an origination of a regional aircraft boarding pier 2300 which is referred to as a "twenty-pack" regional aircraft boarding pier 2300. By "twenty-pack" it is intended that about twenty boarding locations are disposed along the regional aircraft boarding pier 2300.

According to an embodiment, a first primary regional aircraft passenger bridge 2312 leads from the terminal 30, to a hub 2313. In this embodiment the primary regional aircraft passenger bridge 2312 is referred to as a first primary regional aircraft passenger bridge 2312. Somewhere along the first primary regional aircraft passenger bridge 2312, a second primary regional aircraft passenger bridge 2311 leads back to a mid-pier hub 2213. At the mid-pier hub 2213, a plurality of secondary regional aircraft passenger bridges 2318 extend therefrom.

Of the about twenty boarding locations, about six of them are terminal end secondary regional aircraft passenger bridges 2316 and about fourteen of them are mid-pier secondary regional aircraft passenger bridges 2318. In one embodiment by way of non-limiting example, at least one secondary regional aircraft passenger bridge can be a large-aircraft passenger bridge 2315 such as one of the passenger bridges which is at or near the terminal end of a given regional aircraft boarding pier 2300. In one embodiment, the difference between the terminal-end secondary regional aircraft passenger bridge 2316 and the terminal-end large-aircraft passenger bridge 2315 is a structural difference. In one embodiment, the difference is a mere designational difference.

In another embodiment by way of non-limiting example, at least one mid-pier secondary regional aircraft passenger bridge can be a large-aircraft passenger bridge 2317 as depicted in FIG. 23. In one embodiment, the difference between the mid-pier secondary regional aircraft passenger bridge 2318 and the mid-pier large-aircraft passenger bridge 2317 is a structural difference. In one embodiment, the difference is a mere designational difference.

In one embodiment, the mid-pier hub 2313 includes at least one passenger amenities facility as set forth herein. In one embodiment, the various mid-pier hubs 2313 can include different passenger amenities facilities among them, which can provide a full compliment of traditional passenger amenities facilities. Accordingly, pedestrian passenger congestion in the concourse 30 can be alleviated by advancing at least some of the passengers who are boarding and/or transferring at the regional aircraft boarding pier 2300 out of the concourse 30.

Figure 24:
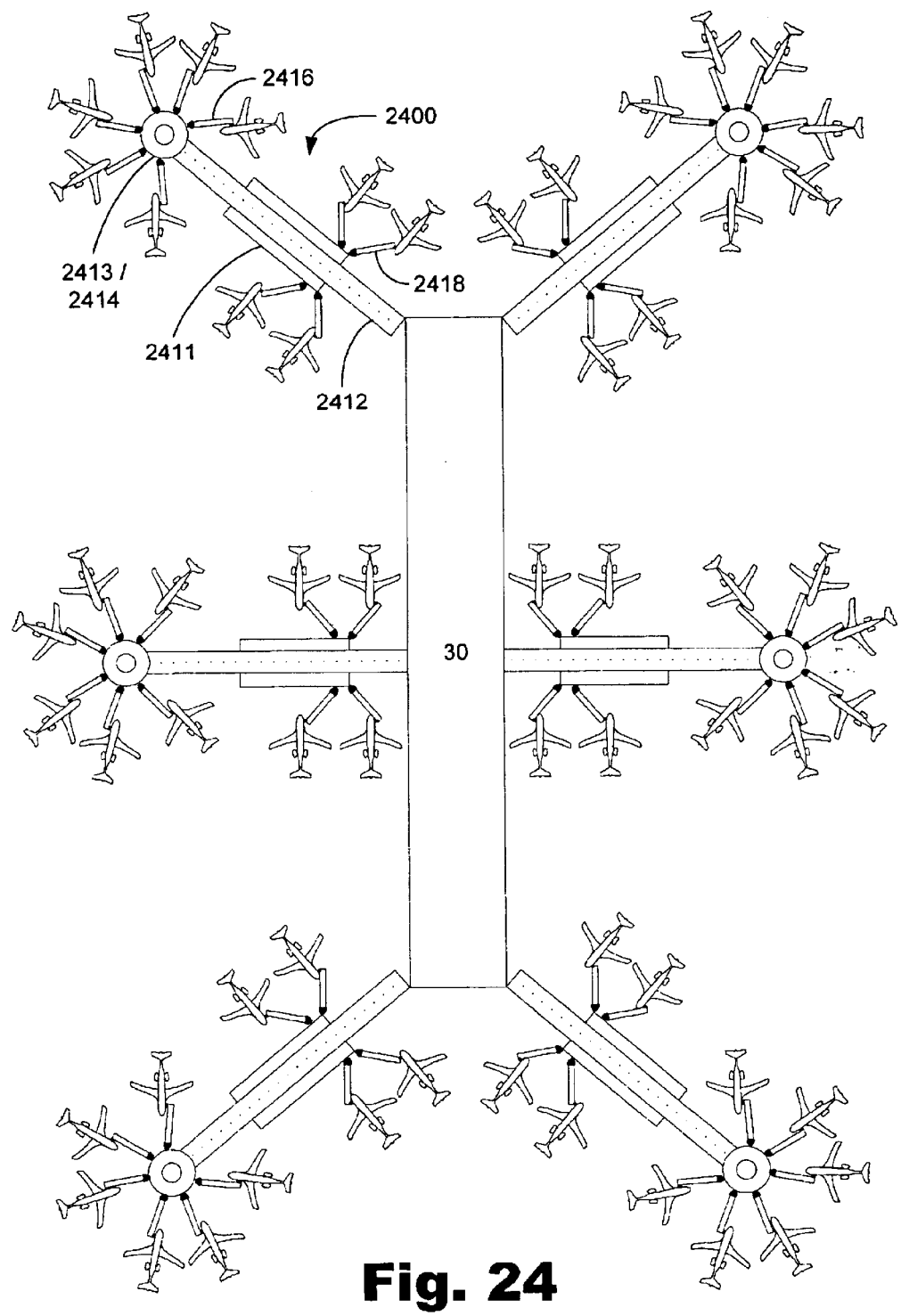
FIG. 24 illustrates another embodiment where a terminal is an origination of a 60-gate concourse, which includes at least one regional aircraft boarding pier.
Figure 25A:
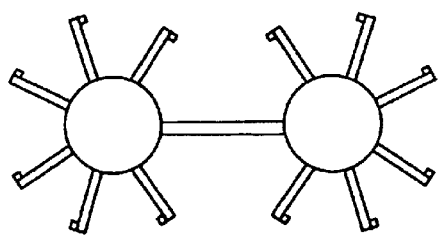
FIGS. 25A through 25F illustrate various embodiments for pier hubs with passenger amenities facilities. In the drawings, identical reference numbers indicate identical items and/or structural elements, regardless of the level of detail provided in any individual drawing.
Figure 25D:
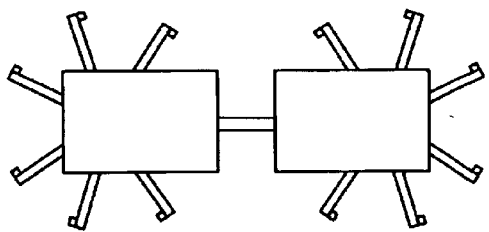
Figure 25B:
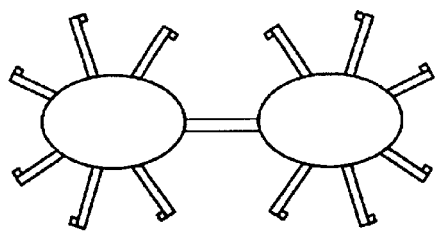
Figure 25E:
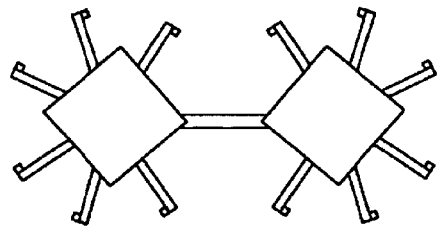
Figure 25C:
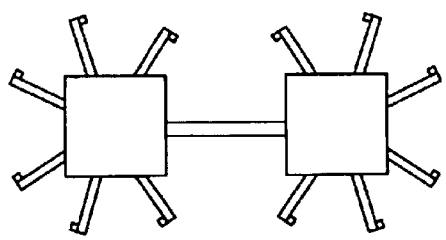
Figure 25F:
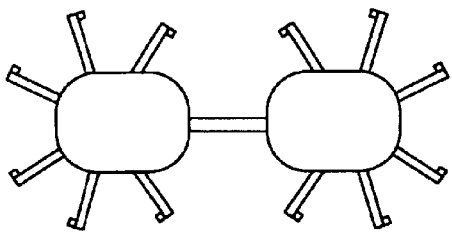

FIG. 24 is a plan view of a 60-gate concourse, which includes six "ten-pack" regional aircraft boarding piers 2400, one of which is so designated. The regional aircraft boarding pier 2400 extends from a terminal 30 which can be a mid-field concourse or a traditional concourse. According to an embodiment, a first primary regional aircraft passenger bridge 2412 leads from the terminal 30, to a hub which can be designated a hub 2414 which includes substantially no passenger amenities facilities, or a hub 2413 which includes at least one passenger amenities facility as set forth herein. In this embodiment, the primary regional aircraft passenger bridge 2412 is referred to as a first primary regional aircraft passenger bridge 2412. Somewhere along the first primary regional aircraft passenger bridge 2412, a second primary regional aircraft passenger bridge 2411 leads back to a plurality of mid-pier secondary regional aircraft passenger bridges 2418.

FIG. 25 represents several plan views of regional aircraft boarding piers according to several embodiments. FIGS. 25A through 25F illustrate various embodiments for pier hubs with passenger amenities facilities. The various embodiments for pier hubs are selected according to a given design or a specific need. In FIGS. 25A through 25F, the placement of secondary regional aircraft passenger bridges is arbitrary, and can be modified to fit a given shape of the pier hub. In FIGS. 25A through 25F, the various pier hubs include respective shapes of round, eccentric (elliptical), square, rectangular, diamond, and racetrack (FIG. 25F).

In one embodiment, the primary regional aircraft passenger bridge 12, the hub 14, 314, 414, and the plurality of secondary regional aircraft passenger bridges 16 are an enclosed space that can be heated or air-conditioned as necessary to enhance passenger comfort. Additionally passengers can quickly transfer between large and regional aircraft without being required to leave the common airport concourse, which services both types of aircraft. The passenger can also experience a seamless transition between aircraft where the regional aircraft boarding pier embodiment is used for transfers between two regional aircraft. Similarly, a passenger can travel on a regional aircraft in a single-use of a boarding pier embodiment. For example, a passenger can board or deplane by use of a boarding pier. Further, a passenger can travel on a regional aircraft in a multiple-use of a boarding pier embodiment. For example, a passenger can board by use of a boarding pier, and the passenger can deplane by use of a boarding pier. Additionally, an embodiment allows the airline staff to be more efficient. As the aircraft are more closely docked, it becomes easier to provide equipment and personnel to service and maintain the aircraft. Consequently, fewer staff are required to service the same number of aircraft. Similarly, the sharing of aircraft support equipment can decrease the overall need for equipment. For example, a single 400 Hz generator could service up to seven regional aircraft or more. Additionally, a single conditioning air unit could service up to seven regional aircraft or more. This shared support equipment could be conveniently housed beneath the hub of the regional aircraft boarding pier 10, 110 according to an embodiment.

Where a passenger is wheelchair bound, no lift is needed to accommodate boarding and deplaning of a regional aircraft under the principles several embodiments. Additionally according to an embodiment, the wheelchair bound passenger remains in a closed and conditioned space and is not subject to inclement weather or transferring to a remote concourse. Passengers have the same or a similar experience of transferring between regional aircraft as has conventionally been the case transferring between large aircraft within the concourse system of a major airport. Moreover, the inventive design disclosed herein allows a per passenger seat cost that is competitive with large aircraft boarding bridges.

The preceding description has been presented only to illustrate and describe the invention. It is not intended to be exhaustive or to limit the invention to any precise form disclosed. Many modifications and variations are possible in light of the above teaching.

Several embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A regional aircraft boarding pier, comprising:
    first primary passenger bridge extending from an airport terminal;
    a first pier hub connected to the first primary passenger bridge; and a first plurality of secondary passenger bridges connected to, and extending from, the pier hub, wherein at least one of the secondary passenger bridge includes a docking end for docking with a regional aircraft.

2. The regional aircraft boarding pier according to claim 1, wherein at least one of the plurality of secondary passenger bridges includes a docking end for docking with a large aircraft.

3. The regional aircraft boarding pier according to claim 1, further including:
    at least one large-aircraft secondary passenger bridge extending from the pier hub for docking a large aircraft to the regional aircraft boarding pier.

4. The regional aircraft boarding pier according to claim 1, wherein the pier hub includes at least one passenger amenities facility.

5. The regional aircraft boarding pier according to claim 1, wherein the pier hub includes at least one passenger amenities facility, and wherein the pier hub includes a shape selected from circular, eccentric, square, rectangular, diamond, racetrack, and combinations thereof.

6. The regional aircraft boarding pier according to claim 1, further including:
    a second primary passenger bridge extending from the first primary passenger bridge;
    a second pier hub connected to the second primary passenger bridge; and a plurality of secondary passenger bridges connected to, and extending from, the second pier hub, wherein at least one of the secondary passenger bridge includes a docking end for docking with a regional aircraft.

7. The regional aircraft boarding pier according to claim 1, further including:
    a second primary passenger bridge extending from the first primary passenger bridge;
    a second pier hub connected to the second primary passenger bridge; and a plurality of secondary passenger bridges connected to, and extending from, the second pier hub, wherein at least one of the secondary passenger bridges includes a docking end for docking with a regional aircraft, and wherein the total of secondary passenger bridges is equal to about four at the second pier hub, and about six at the first pier hub.

8. The regional aircraft boarding pier according to claim 1, further including:
    a second primary passenger bridge extending from the pier hub;
    a second pier hub connected to the second primary passenger bridge; and
    a second plurality of secondary passenger bridges connected to, and extending from the second pier hub, wherein at least one of the secondary passenger bridges includes a docking end for docking with a regional aircraft.

9. The regional aircraft boarding pier according to claim 1, further including:
    a second primary passenger bridge extending from the first pier hub;
    a second pier hub connected to the second primary passenger bridge; and
    a second plurality of secondary passenger bridges connected to, and extending from the second pier hub, wherein at least one of the secondary passenger bridges includes a docking end for docking with a regional aircraft, and wherein the number of secondary passenger bridges at the second pier hub is about six.

10. The regional aircraft boarding pier according to claim 1, wherein at least one of the primary passenger bridge, the pier hub, the plurality of second regional aircraft passenger bridges is in controlled space selected from enclosed space, temperature-controlled space, and a combination thereof.

11. A terminal comprising:
    at least one large aircraft boarding bridge extending from an airport terminal for docking a large aircraft; and
    at least one regional aircraft boarding pier, including:
        a first primary passenger bridge extending from the airport terminal;
        a first pier hub connected to the primary passenger bridge; and
        a first plurality of secondary passenger bridges connected to, and extending from, the first pier hub, wherein at least one of the secondary passenger bridge includes a docking end for docking with a regional aircraft.

12. The terminal according to claim 11, wherein the large aircraft boarding bridge and the regional aircraft boarding pier are connected to a single, common concourse within the terminal.

13. The terminal according to claim 11, further including:
    at least one large-aircraft passenger bridge extending from the first pier hub.

14. The terminal according to claim 11, wherein the first pier hub optionally includes at least one passenger amenities facility.

15. The terminal according to claim 11, wherein the first pier hub optionally includes at least one passenger amenities facility, and wherein the first pier hub includes a shape selected from circular, eccentric, square, rectangular, diamond, racetrack, and combinations thereof.

16. The terminal according to claim 11, further including:
    a second primary passenger bridge extending from the first primary passenger bridge;
    a second pier hub connected to the second primary passenger bridge; and a plurality of secondary passenger bridges connected to, and extending from, the second pier hub, wherein at least one of the secondary passenger bridges includes a docking end for docking with a regional aircraft, and wherein the total of secondary passenger bridges is equal to about four at the second pier hub, and about six at the first pier hub.

17. The terminal of claim 11, further including:
    a second primary passenger bridge extending from the first pier hub;

a second pier hub connected to the second primary passenger bridge; and a second plurality of secondary passenger bridges connected to, and extending from, the second pier hub, wherein at least one of the secondary passenger bridges includes a docking end for docking with a regional aircraft.

18. A method of constructing an airport terminal including at least one concourse, the method comprising:

assembling at least one regional aircraft boarding pier at a terminal, the least one regional aircraft boarding pier including:

a first primary passenger bridge extending from a concourse of the terminal;

a first pier hub connected to the first primary passenger bridge; and a plurality of secondary passenger bridges connected to, and extending from, the pier hub, wherein at least one of the secondary passenger bridges includes a docking end for docking with a regional aircraft.

19. The method of claim 18, further including: removing at least one large aircraft passenger bridge connected to the concourse; and assembling a regional aircraft boarding pier is performed by assembling the regional aircraft boarding pier where the at least one large aircraft passenger bridge was removed.

20. The method of claim 18, further comprising including: constructing at least one large-aircraft passenger bridge extending from the pier hub for docking a large aircraft to the regional aircraft boarding pier.

* * * * *